(12) United States Patent
Morgan

(10) Patent No.: US 7,212,308 B2
(45) Date of Patent: May 1, 2007

(54) INTERACTIVE PHOTO KIOSK

(76) Inventor: Carol L. Morgan, P.O. Box 1755, Easton, MD (US) 21601-1755

( * ) Notice: Subject to any disclaimer, the term of this patent is extended or adjusted under 35 U.S.C. 154(b) by 730 days.

(21) Appl. No.: 10/321,725

(22) Filed: Dec. 18, 2002

(65) Prior Publication Data
US 2004/0120008 A1 Jun. 24, 2004

(51) Int. Cl.
G06F 15/00 (2006.01)
G06K 1/00 (2006.01)

(52) U.S. Cl. .................... 358/1.18; 463/11; 283/93; 358/296; 705/1

(58) Field of Classification Search ............. 283/93
See application file for complete search history.

(56) References Cited

U.S. PATENT DOCUMENTS

| | | | |
|---|---|---|---|
| 3,732,640 A * | 5/1973 | Changnon | 283/108 |
| 4,460,634 A | 7/1984 | Hasegawa | |
| 4,695,142 A | 9/1987 | Holt | |
| 4,959,670 A | 9/1990 | Thayer, Jr. | |
| 5,091,791 A * | 2/1992 | Mitchell | 358/479 |
| 5,109,281 A | 4/1992 | Kobori et al. | |
| 5,345,313 A | 9/1994 | Blank | |
| 5,539,453 A * | 7/1996 | David et al. | 348/77 |
| 5,587,740 A * | 12/1996 | Brennan | 348/373 |
| 5,615,296 A * | 3/1997 | Stanford et al. | 704/270.1 |
| 5,623,581 A * | 4/1997 | Attenberg | 358/1.6 |
| 6,048,043 A * | 4/2000 | Kaspar | 312/223.3 |
| 6,085,195 A * | 7/2000 | Hoyt et al. | 707/10 |
| 6,141,482 A | 10/2000 | Massarksy | |
| 6,175,343 B1 * | 1/2001 | Mitchell et al. | 345/8 |
| 6,326,934 B1 * | 12/2001 | Kinzie | 345/1.1 |
| 6,591,068 B1 * | 7/2003 | Dietz | 396/429 |
| 6,657,702 B1 * | 12/2003 | Chui et al. | 355/40 |
| 6,658,817 B1 * | 12/2003 | Eve et al. | 53/411 |
| 6,814,375 B2 * | 11/2004 | Cox et al. | 283/61 |
| 6,849,308 B1 * | 2/2005 | Speakman et al. | 427/595 |

(Continued)

OTHER PUBLICATIONS

'Persona C25 Card Printers'. PROVANTAGE Computer Products SuperStore Fargo Electronics [online]. 2002 [retrieved on Nov. 11, 2002]. Retrieved from the internet: <URL: www.provantage.com/FP_62319.HTM>.

(Continued)

Primary Examiner—King Y. Poon
Assistant Examiner—Benjamin Dulaney
(74) Attorney, Agent, or Firm—Foley & Lardner LLP

(57) ABSTRACT

A digital imaging kiosk, comprising an imaging device adapted to electronically capture an image of an object, a display device adapted to display at least one of a captured image, a user interface adapted to display information to a user and to receive information from a user, a printing device adapted to print a manipulated or non-manipulated image on one or more sides of one or more substrates, a substrate handling device adapted to position a substrate in proximity to the printing device such that the printing device can print to the one or more substrates, a control unit in communication with the information suite, wherein the kiosk is adapted so that the printing device prints the image captured by the image capturing device on a first side of a set number of substrates having a preprinted and unique image on a second side of the set number of substrates.

48 Claims, 7 Drawing Sheets

First Side

Second Side

U.S. PATENT DOCUMENTS 7,010,581 B2* 3/2006 Brown et al. ............... 709/218
7,016,059 B1* 3/2006 Baum et al. ............... 358/1.15

OTHER PUBLICATIONS

'Overview of Photo ID Card Printer Systems'. Idcardprinter [online]. 2002 [retrieved on Nov. 11, 2002]. Retrieved from the internet: <URL: www.idcardprinter.net/>.

'Printing Process'. The College of New Jersey [online]. 2002 [retrieved on Nov. 11, 2002]. Retrieved from the internet: <URL: www.tcnj.edu/~print/pages/paper.shtml>.

*KIS Kiosk Component Series Price List*, (Oct. 2001), pp. 1-8.

'Identification Card Printers'. PROVANTAGE Computer Products SuperStore Printers and Accessories [online]. 2002 [retrieved on Nov. 11, 2002]. Retrieved from the internet: <URL: www.provantage.com/ffprntar.htm>.

'Entry Level Systems'. Idcardprinter [online]. 2002 [retrieved on Nov. 11, 2002]. Retrieved from the internet: <URL: www.idcardprinter.net/systems.html>.

'HDP710 & HDP720 specifications'. Fargo Electronics [online]. 2002 [retrieved on Nov. 11, 2002]. Retrieved from the internet: <URL: www.fargo.com/products/hdp_specifications.asp>.

'Eltron Series ID Card Printers'. RACO Product Categories [online]. 2002 [retrieved on Nov. 8, 2002]. Retrieved from the internet: <URL: www.racoindustries.com/e;p310c.htm>.

'Advantidge-Secure Identification Systems'. Advantidge—Fargo Card Printers [online]. 2002 [retrieved on Nov. 11, 2002]. Retrieved from the internet: <URL: www.advantidge.com>.

'Identification Card Printers'. CompuCard, Inc. [online]. 2002 [retrieved on Nov. 11, 2002]. Retrieved from the internet: <URL: www.compucard.net/page5.html>.

'UV Screen inks for Optical Recording Media'. Teikoku Technical Topics [online]. 2002 [retrieved on Nov. 11, 2002]. Retrieved from the internet: <URL: www.teikokuink.com/tech-topics/111-e.htm>.

'Overview- About Us'. Idcardprinter [online]. 2002 [retrieved on Nov. 11, 2002]. Retrieved from the internet: <URL: www.idcardprinter.net/aboutus.htm/>.

'Card Finishes'. Innovative Plastics [online]. 2002 [retrieved on Nov. 11, 2002]. Retrieved from the internet: <URL: www.innov8cards.com/services.htm>.

'Kodak Professional ML-500 Digital Photo Print System Features'. LOGIX [online]. 2002 [retrieved on Nov. 8, 2002]. Retireved from the internet: <URL: www.logix-usa.com/KodakML500Features.html>.

'Kodak Professional 8500 Digital Photo Printer'. LOGIX [online ]. 2002 [retrieved on Nov. 8, 2002]. Retrieved from the internet: <URL: www.logix-usa.com/Kodak8500Intro.html>.

'PVC Plastic Card Uses'. RACO Product Categories [online]. 2002 [retrieved on Nov. 8, 2002]. Retrieved from the internet: <URL: www.racoindustries.com/carduses.htm>.

'Eltron ID Card Printers'. RACO Product Categories [online]. 2002 [retrieved on Nov. 8, 2002]. Retrieved from the internet: <URL: www.racoindustries.com/elp520c.htm>.

'Eltron P Series Card Printers'. RACO Product Categories [online]. 2002 [retrieved on Nov. 8, 2002]. Retrieved from the internet: <URL: www.racoindustries.com/p720.htm>.

'Mitsubishi CP-2000U Dye Sublimation Printer'. Vital Image Technology Imaging Applications [online]. 2002 [retrieved on Nov. 8, 2002]. Retrieved from the internet: <URL: www.vitalimage.com/colorprn.html 22 .

'Digital Photo Printers'. LOGIX [online]. 2002 [retrieved on Nov. 8, 2002]. Retrieved from the internet: <URL: www.logix-usa.com/cprinter.html>.

'Success is in the Cards'. On Time *plastic imaging* ' [online]. 2002 [retrieved on Nov. 11, 2002]. Retrieved from the internet: <URL: www.ontimemailing.com/plastic_5.html>.

'Services -Printing'. Sue Peterson & Associates [online] 2002 [retrieved on Nov. 11, 2002]. Retrieved from the internet: <URL: www.suepeterson.com/printing.html>.

'U.V. Coating Guidelines'. Foster Printing UV Coating Guidelines [online]. 2002 [retrieved on Nov. 11, 2002]. Retrieved from the internet: <URL: www.fosterprint.com/uv_ctng_gdlns.htm>.

'Pro Card Printer'. CompuCard, Inc. [online]. 2002 [retrieved on Nov. 11, 2002]. Retrieved from the internet: <URL: www.compucard.net>.

'Questions to Consider Before Purchasing a Card Printer'. RACO Industries [online]. 2002 [retrieved on Nov. 11, 2002]. Retrieved from the internet: <URL: www.racoindustries.com/cardquestions.htm>.

'FARGO Card Printer Products'. Fargo Electronics [online]. 2002 [retrieved on Nov. 11, 2002]. Retrieved from the internet: <URL: www.fargo.com/products/>.

'U.V. Equipment Specifications'. Foster Printing UV Coating Guidelines [online]. 2002 [retrieved on Nov. 11, 2002]. Retrieved from the internet: <URL: www.fosterprint.com/uv_ctng_gdlns.htm>.

'Kodak ML-500 Digital Photo Printer'. LOGIX [online]. 2002 [retrieved on Nov. 8, 2002]. Retrieved from the internet: <URL: www.logix-usa.com/KodakML500Intro.html>.

* cited by examiner

INTERACTIVE PHOTO KIOSK

BACKGROUND OF THE INVENTION

Earlier photo kiosks depended on photographic processes that were limited in their capabilities to produce combined images and were enclosed within a booth arrangement that required additional square feet of floor space. As technology developed, computer generated images offered opportunities to produce instant photos in formats that combined the image with a background or foreground of the users choice. Technology improved to provide the ability to generate multiple output photos using a digital still camera format. The results produced images on single sheets and/or multiple "stickers" hard copies.

Digital images captured in a kiosk with a camera have been printed in black and white. The output has been a single sheet of individual photos with or without backgrounds or foregrounds. These kiosks have not been user friendly in that they fail to give the user options to add other elements. Past photo booths have limited the flexibility for the user to interact on the ultimate output.

SUMMARY OF THE INVENTION

In one embodiment of the present invention a digital imaging kiosk, comprising an imaging device adapted to electronically capture an image of an object within visual range of the imaging device, an information suite comprising a display device adapted to display at least one of an image associated with a captured image captured by the imaging device; a user interface adapted to display information to a user and to receive information from a user, the user interface being integral with the display device or separate from the display device or partially integral with the display device and partially separate from the display device; a printing device adapted to print to at least one side of one or more substrates; a substrate handling device adapted to position a substrate in proximity to the printing device such that the printing device can print to the one or more substrates and an electronic control unit in communication with the information suite, the control unit being adapted to receive and send information to the information suite and to control one or more components of the kiosk based on at least one of information from the user, a predetermined routine, and a combination of information from the user and a predetermined routine; wherein the kiosk is adapted so that the printing device prints an image associated with the image associated with the captured image captured by the imaging device on a first side of a set number of substrates having a preprinted image on a second side of the set number of substrates, the preprinted image being unique from the preprinted image on the substrate printed to immediately before.

In another embodiment of the present invention the kiosk is adapted to print text along with the printed image.

In another embodiment of the present invention the kiosk is adapted so that the text printed along with the image is selected by the user.

In another embodiment of the present invention the kiosk is adapted so that the text printed along with the image can be inputted by the user.

In another embodiment of the present invention the kiosk is adapted so that at least part of the text printed along with the image can be inputted by the user.

In another embodiment of the present invention the kiosk is adapted so that the user can speak to select at least part of the text printed along with the image.

In another embodiment of the present invention the kiosk is adapted so that the user can spell out at least part of the text printed along with the image.

In another embodiment of the present invention the kiosk is adapted to allow the user to select the image displayed by the display device.

In another embodiment of the present invention the kiosk is adapted to allow the user to select an image from a plurality of the images displayed on the display device.

In another embodiment of the present invention at least one of the plurality of images are displayed separately temporally from at least one other of the plurality of images.

In another embodiment of the present invention the kiosk further includes an image manipulating device adapted to manipulate the captured image.

In another embodiment of the present invention the kiosk is adapted to allow the user to manipulate the captured image.

In another embodiment of the present invention the kiosk is adapted to manipulate the captured image automatically.

In another embodiment of the present invention the kiosk display device is a high-resolution monitor.

In another embodiment of the present invention the kiosk has a high-resolution monitor is an LCD.

In another embodiment of the present invention the display device is adapted to receive input from the user.

In another embodiment of the present invention the kiosk is adapted to allow the user to adjust at least one of the imaging device height, the imaging device focus, and the imaging device direction.

In another embodiment of the present invention the kiosk also includes an audio system adapted to convey information to the user, the audio system being integrated with the communications suite or being separate from the communications suite.

In another embodiment of the present invention the kiosk is adapted so that the information conveyed by the audio system is synchronized with at least some of the information displayed to the user by the information suite.

In another embodiment of the present invention the kiosk image capturing device includes an auto-focus device adapted to focus the imaging device on at least one portion of the user.

In another embodiment of the present invention the communication suite is adapted to display advertisements to the user.

In another embodiment of the present invention at least one of the user interface is adapted to display advertisements to the user and the audio-system is adapted to annunciate advertisements to the user.

In another embodiment of the present invention the kiosk has at least one side panel extending from the body of the kiosk and includes display components located to be substantially to the sides of the user, wherein the display components are adapted to display advertisements.

In another embodiment of the present invention the image manipulating device is adapted to alter the background of the image captured by the imaging device.

In another embodiment of the present invention the background is altered based on a predetermined theme associated with the geographic location of at least the image capturing portion of kiosk.

In another embodiment of the present invention the substrate comprises an individual card from a deck of playing cards, the back side of the card being the first side of the substrate, the face side being the second side of the substrate, and the kiosk is adapted to provide the user with at least one full deck of playing cards.

In another embodiment of the present invention the text is also printed on the first side of the substrate.

In another embodiment of the present invention the control unit is located separate from the imaging device.

In another embodiment of the present invention the control unit is linked to the image capturing device, the link being at least one of an electrical, optical, RF, and IR link.

In another embodiment of the present invention the kiosk is adapted to electronically record an image associated with at least the captured image and at least some of the information inputted by the user to enable the user be contacted at a later date.

In another embodiment of the present invention the printing device utilizes a UV energy curing ink.

In another embodiment of the present invention the kiosk is adapted to provide the user with a container with the playing cards.

In another embodiment of the present invention the container is a pre-diecut cardboard embryo adapted to allow a user to assemble the diecut into a box, the assembled box being of a suitable size to contain at least one complete deck of playing cards.

In another embodiment of the present invention at least the imaging device is adapted to be mobile.

In another embodiment of the present invention the kiosk is adapted to be mobile.

In another embodiment of the present invention at least one of the electronic components of the kiosk are powered by at least one of a fuel cell, a battery, and a solar-power array.

In another embodiment of the present invention the kiosk further includes at least one of a satellite array, a phone link array, a commercial wireless link array, and a infrared communication port.

In another embodiment of the present invention the kiosk is adapted to accept credit card information or debit card information.

In another embodiment of the present invention the kiosk is adapted to accept cash or coins and dispense cash or coins.

In another embodiment of the present invention the kiosk is adapted to transmit and receive data.

In another embodiment of the present invention the kiosk is adapted to transmit at least one status message.

In another embodiment of the present invention there is a method of operating a digital imaging kiosk, comprising capturing an image with an imaging device adapted to electronically capture an image of an object within visual range of the imaging device; displaying on a display device an image associated with a captured image captured by the imaging device; displaying information on a user interface adapted to display information to a user and to receive information from a user, the user interface being integral with the display device or separate from the display device or partially integral with the display device and partially separate from the display device, wherein the display device and the user interface comprise an information suite; printing from a printing device adapted to print to at least one side of one or more substrates; positioning a substrate in proximity to the printing device with a substrate handling device such that the printing device can print to the one or more substrates; and controlling the kiosk with an electronic control unit in communication with the information suite, the control unit being adapted to receive and send information to the information suite and to control one or more components of the kiosk based on at least one of information from the user, a predetermined routine, and a combination of information from the user and a predetermined routine; wherein the kiosk is adapted so that the printing device prints an image associated with the image associated with the captured image captured by the imaging device on a first side of a set number of substrates having a preprinted image on a second side of the set number of substrates, the preprinted image being unique from the preprinted image on the substrate printed to immediately before.

Another embodiment of the present invention further comprises printing text along with the printed image.

In another embodiment of the present invention, the substrate comprises an individual card from a deck of playing cards, the back side of the card being the first side of the substrate, the face side being the second side of the substrate, and the kiosk is adapted to provide the user with at least one full deck of playing cards.

In another embodiment of the present invention text is also printed on the first side of the substrate.

In another embodiment of the present invention the substrate handling device is adapted to hold substrate in roll form and supply substrate to the printer by unrolling the substrate from the roll.

In another embodiment of the present the kiosk is adapted to separate the substrate from the roll prior to positioning the substrate in proximity to the printing device.

In another embodiment of the present invention the kiosk is adapted to separate the substrate from the roll after positioning the substrate in proximity to the printing device.

In another embodiment of the present invention the kiosk utilizes prescalloped substrate, and the substrate is in a roll prior to being positioned in proximity to the printing device In another embodiment of the present invention the kiosk is configured with a die cutter, and wherein the die cutter alters the shape of the substrate.

DETAILED DESCRIPTION OF THE PREFERRED EMBODIMENTS

Figure 1:
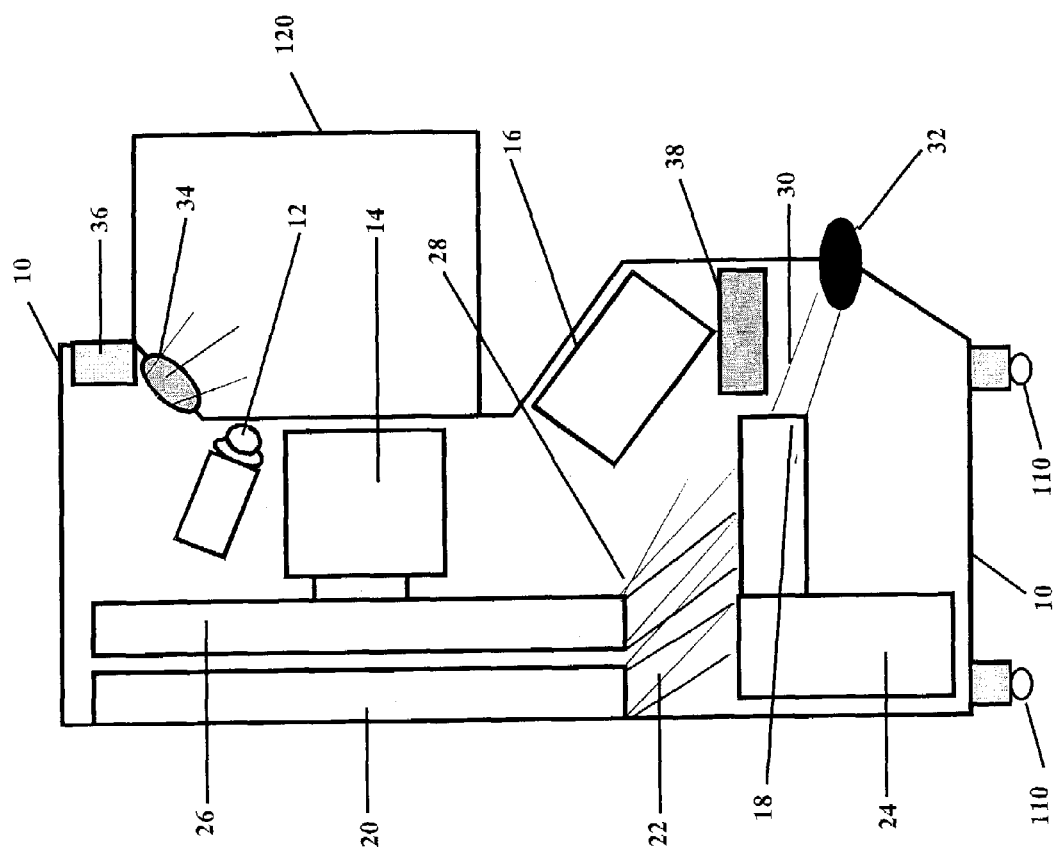
FIG. 1 schematically illustrates a kiosk according to the present invention as seen from the side.

Referring now to the embodiment shown in FIG. 1, a side view of a digital imaging kiosk 10 which includes an imaging device 12 which in the preferred embodiment serves as an imaging device that is adapted to electronically capture an image of an object within visual range of the imaging device, a display device 14 that in the preferred embodiment is a monitor, preferably an LCD monitor, and is adapted to display at least one of the captured images, and a touch screen 16 which in the preferred embodiment functions as a user interface which is adapted to display information to a user and to receive information from a user. It is noted that the embodiment shown in FIG. 1, the touch screen is separate from the display device 14. However, in an alternate embodiment, the touch screen 16 can be integral with the display device 14. It is further noted that other embodiments could have the display device or at least a portion of the display device can function as a touch screen and the kiosk can alternatively also have a separate touch screen. The kiosk of the preferred embodiment further includes a printer 18 and a substrate magazine 20. The substrate magazine 20 can, in conjunction with the substrate chute 22, function as a substrate handling device adapted to position a substrate in proximity to the printing device. The kiosk further includes an electronic control unit 24 which is in communication with various components of the kiosk, but in particular, with the communication suite. It is noted that the electronic control unit 24 is shown without any connections to the other components in the interests of clarity.

As can be seen, the kiosk 10 of the present invention, as is embodied in the preferred embodiments, comprises multiple components. While these components are shown as separate from each other, it is noted that a single device that satisfies the function of two or more components can be used to practice the present invention.

The imaging device 12 of the preferred embodiment is a digital camera and/or video camera which operates on the same principles as an ordinary digital camera that is used to take and optionally record pictures electronically and then download those pictures to a computer or other electronic viewing device. The imaging device of the preferred embodiment takes one or more still pictures and optionally records the pictures electronically thus capturing the image. However, it is noted that the imaging device 12 of the preferred embodiment does not have to record the image to capture the image, as it is sufficient that the imaging device 12 simply communicates the captured image to some other component of the kiosk, preferably but not limited to or exclusively to the control unit 24. However, embodiments of the present invention can be practiced with a camera that takes motion pictures such as would be taken by a camcorder or other device that records active movement. In such a case, it is noted that the control unit 24 and/or the image manipulating device and/or the imaging device 12 could be adapted to freeze the video image upon command and display the image captured image on the display device 14. It is further noted that the camera is not limited to a traditional digital imaging device or digital camcorder. Indeed, any device that will have as its function the ability to capture an image and convert it to an electronic format or electronically readable format will suffice to practice the invention. The imaging device 12 of the preferred embodiment will be adapted to automatically focus on preferably the head and shoulders of the user, which results in defocusing of the background surrounding the user. However, other embodiments can have an imaging device adapted to focus on other portions of the user. Further, the present invention can be practiced with an imaging device 12 that does not automatically focus, but instead remains focused on a point or location at a predetermined specified distance from the imaging device. In such a case it would be up to the user to position himself or herself at an appropriate distance from the imaging device. Recognizing that this embodiment does not produce as clear an image as the automatically focusing imaging device an embodiment of the kiosk could possibly have a software mechanism or a computer mechanism to sharpen the image and correct for the fact that the image is not in proper focus. Also, the present invention can be practiced with a device that will allow the user to focus the imaging device 12.

The imaging device 12, or at least some components of the imaging device 12, of the preferred embodiment will be adapted to move or be moved in a variety of directions to accommodate, say, the height and/or the location of the user or users. To enable the imaging device to move, the preferred embodiment of the kiosk will support the imaging device with a multi-directional adjustable mount which can be adjusted, for example, by electrical motors. This multi-directional mount could be controlled by the control unit 24, or could be directly controlled by the user, or controlled through shared control or alternating control by the user and the control unit 24. Also, the imaging device 12 could be adapted to change the angle of view. For example, when multiple users desire their image to be captured at the same time or, alternatively, a particularly large user desires his or her image to be captured, a wide angle image will be captured. The angle of view can be controlled in at least the same or similar ways as just mentioned in regard to the control of the multi-directional mount.

In the case of imaging device movement under control of the control unit 24, the kiosk of the present invention could be equipped with a sensing device, such as by way of example and not by limitation, a laser range/height/location system, which would be linked to the control unit and/or the imaging device, thus providing data to the kiosk in general and these components in particular to better position and/or focus the imaging device 12.

The imaging device 12 of the preferred embodiment would be a color, high resolution camera. However, the present invention can be practiced with a black and white camera or a gray tone camera or a camera that detects and/or captures and/or outputs color in some color frequencies but not all color frequencies. As noted above, the imaging device 12 will preferably have the ability to take both wide angle and narrow angle pictures, thus permitting multiple users to have their image taken, or alternatively to vary the margins on either side of, say, the face of a single user, or to vary the margins around, say, a group of users.

The display device 14 as shown in FIG. 1 is preferably a flat panel display with both VGA and DVI inputs based on current LCD display technology. By way of example only and not by way of limitation, the preferred embodiment would have a panel type TFT LCD having a size of approximately fifteen inches, a pixel pitch of 0.297 millimeters, a brightness of 200 candles per meter squared, a contrast ratio of 300 to 1, a viewing angle of 140–120°, a horizontal rate of 30–61 kilohertz, a vertical rate of 56–75 kilohertz, and would have an operating temperature of between 0–40° C. However, the present invention is not limited to such a monitor configuration and would include monitors which, for example, could be operated at temperatures below 0° C. and above 40° C. This would be the case, for example, in kiosks which are located in national parks in the outdoors. Further, the present invention could be practiced with displays of much larger size or possibly smaller size. The preferred embodiment would have a traditional rectangular screen where the width is longer than the height, much as is the case with a laptop computer. However, other embodiments of the kiosk would have a monitor that is square wherein the horizontal and vertical dimensions are the same, or where the vertical dimensions are longer than the horizontal dimension. By way of example only and not by way of limitation, the monitor could range in sizes from less than or equal to five inches to greater than or equal to twenty two inches. Such LCD monitors are provided by, for example, Horizon Technology Company. It is noted that while the preferred embodiment utilizes a liquid crystal display monitor, other embodiments of the present invention can be practiced using cathode ray tubes. Indeed, any system which will adequately display the image captured by the imaging device 12 and/or a modified image can be used to practice the present invention. That is, the preferred embodiment of the present invention has a display device 14 that is adapted to display at least one image that is the same or is associated with a captured image captured by the imaging device 12. By way of example only and not by way of limitation, an image can be associated with a captured image by being an image that is a manipulated version of the captured image, where manipulation includes but is not limited to altering the background of the image or another form of manipulation as described below. Further by way of example, an image can be associated with a captured image by being the same image as the captured image captured by the imaging device. To this end, a preferred embodiment of the present invention could have advanced graphics capability, such as by way of example and not by way of limitation, graphics software packages such as photoshop or derivatives thereof, that would allow the image to be modified. The kiosk could be equipped with in addition or as a substitute with other graphics capabilities as well.

The touch screen 16 allows the kiosk to display information to the user and also to allow the user to input information into the kiosk without the need for moving press buttons, or to simply reduce the number of moving parts needed to practice the invention. However, it is noted that the present invention does not require the use of a touch screen. Indeed, a preprinted set of instructions associated with, say, light bulbs or LEDs or illuminated from the back by light bulbs or LEDs which illuminate depending on what information the kiosk needs to display to the user will suffice. Such a system would be associated with a traditional push button input system and/or a heat sensing sensor to allow the user to input information into the kiosk. Still, it is noted that the preferred embodiment utilizes a touch screen. Such a touch screen used in the kiosk can be acquired from companies such as 3M. The touch screen 16 of the preferred embodiment will allow the kiosk to display a variety of instructions and ask via text questions to the user. Further, it will allow the user to input instructions via a touch screen typewriter keypad or other form of keypad not following traditional typewriter scheme or by a more macroscopic means of inputting information such as answering specific questions proffered (in a predetermined fashion) by the kiosk. It is noted that it is not necessary that the touch screen display information. Indeed, it is possible to practice the invention with a display device 14 that displays information to be conveyed from the kiosk to the user and a touch screen to simply receive information from the user. Further, the present invention can be practiced using a touch screen and display device combined in one such that the display device serves also as the touch screen.

The touch screen 16 of the preferred embodiment is located so that the user is afforded the ability to reach at least a portion of the touch screen while being positioned in front of the kiosk 10 at the appropriate position to have his or her image captured. This is preferred as this will allow the user to frame a desired image according to the users height by allowing the user to "press," by way of example only and not by limitation, up and down arrows or left and right arrows and/or angle of view arrows on the touch screen 16 to adjust the direction and/or the angle of view of the imaging device.

It is further noted that the present invention could be practiced by utilizing a voice activated system as well. That is, the kiosk could be adapted so that it would receive verbal inputs from a user or users, interpret those voice commands, and then act on those commands. Thus, the kiosk could be provided with a microphone and a device that would be able to interpret voice commands. In such embodiments, the kiosk could be configured with the voice recognition system as well as a touch-based system, or could be configured with only a voice recognition system. Such systems are know in the art and will not be detailed here, and are incorporated by reference for use in various embodiments of the kiosk. Also, later developed voice recognition system not currently known can also be adapted to practice the present invention.

Collectively the display device 14 and the touch screen 16 can be considered an information suite in that it provides information to the user and receives information from the user. As noted above, the touch screen 16 can be integral with the display device 14. In such a case, the kiosk can have a separate touch screen as well. Basically, the information suite can be anything that allows the kiosk to display the image captured by the imaging device or a substantially similar image or another image and the information suite shall also be able to present information to the user and to receive information from the user. Any device that can accomplish this can be used to practice the present invention. It is noted that the present invention can be practiced with more than one display device and more than one touch screens.

The sequence of operation of a kiosk 10 of the preferred embodiment is illustrated by way of example only and not by way of limitation in FIG. 4 which shows a flow-chart, which is discussed below in greater detail. However, a portion of it will be discussed here, or it is applicable to the information suite, starting with the first step in FIG. 4, a prospective user passes by and/or positions himself or herself at a location in front of the kiosk 10, and their color video image is captured by the imaging device 12 and transferred to the control unit 24 which creates an electronic file stored in the control unit 24. The display device 14 then shows a split screen, which allows the image of the prospective user to view their image with or without a template that illustrates a sample of the final product. It is noted that while this is going on, the functions of the preferred embodiment of the kiosk 10 system are coordinated and activated by the software program contained in the computer 24.

Still referring to FIG. 1, the kiosk 10 of the present invention has a printer 18. The printer 18 of the preferred embodiment serves as a printing device which is adapted to print an image whether it be manipulated or non-manipulated which is received from the imaging device on a substrate or a plurality of substrates. The printer 18 in the preferred embodiment can print to more than one side of a substrate. For example, in the case where the substrate is a playing card as is found in a deck of playing cards, the printer 18 could print on both the back side and the front side where the front side is defined as the side that has the face of the card (e.g. ace, two, three, queen, jack, joker, etc.). Indeed, in a preferred embodiment of the present invention, one or more faces on the face cards could be replaced with a captured image. Further, embodiments can be practiced where one image is used as, say the face of the king, and another image is used as, say the face of the queen, and another is used as the face of the joker, and another used as the face of the jack, or any permutations there between. Further, the entire body of the face card could be replaced with a captured image in this manner. However, the present invention can be practiced utilizing a printer that only prints to one side of the substrate. The printer of the preferred embodiment is a high speed color printer. The printer 18 of the preferred embodiment preferably utilizes a quick curing ink. By way of example only and not by way of limitation, the printer 18 could utilize a UV energy curing ink whereby upon exposure to ultraviolet light the ink is instantly polymerized into a dry finished product. The ultraviolet light preferably would be generated by a medium pressure mercury vapor lamp positioned between each printing area. However, other ultraviolet sources can be used to practice the present invention in the case that quick drying ultraviolet energy curing inks are used. Further by way of example, sublimation printing ink can be used in the printer 18. Also, laser printing could be used. Further by way of example, aqueous printing and coatings can be used. One example of a printer 18 that can be used in the kiosk 10 is the Epson kiosk printer, such as the EU-T400 or the EU-T500 series of printers from the Epson Printer Company. However, other printers can be used as well. For example, the Nanoptix Incorporated thermal printer can be used. Also for example, Telpar Incorporated printers can be used. As noted above, the printer 18 utilized in the kiosk 10 is preferably a high speed color printer, although it is noted that the present invention can be practiced with a black and white or a gray scale or a quasi-color printer as well, and that a slower speed printer can be used. The printer of the preferred embodiment will be positioned so that it is easy to refill with ink or inks preferably from a port or a plurality of ports located on one of the exterior surfaces of the kiosk that are readily accessible to a maintainer. However, it is noted that this is not a limitation, only a preferred embodiment. It is noted that the printing device of the current invention is not limited to a traditional printer but can be any device which will allow an image whether it be color or black and white or other color class, to be printed onto a substrate. It is noted that FIG. 1 shows that there is one printer 18 in the kiosk. However, the present invention can be practiced with more than one printer. This would be desirable to enable the kiosk to print faster than using one printer.

The kiosk 10 of the present invention is not limited to just printing ink. By way of example only and not by way of limitation, the kiosk could be adapted to create holograms on the substrate, for example, by printing or by placing premade holograms on the substrate, or both.

Further, it is pointed out that the printer or printers used in the present invention can be printers that print to more than one substrate at the same time. Also, the printer or printers used can be adapted to print on variable sized and orientated substrates. By way of example, a printer could print to a 3×5 card in a portrait and landscape orientation, and the same printer could print to a 4×6 card in a portrait and landscape orientation, and the same printer could print to substrates having a size of 8½×11 and/or 8×10 in a portrait and landscape orientation. Additionally the printer could print to substrates having a size of 1½×2 in a portrait and landscape orientation. Indeed, the printer could print to postage stamp sized substrates in portrait and landscape, or substrates even smaller than postage stamp sized substrates in portrait and landscape. Such a configuration could be used to produce, by way of example, miniature cards which are more convenient for use in smaller spaces, such as while seated in an airliner. Basically, the printer could print to substrates in a variety of sizes in both portrait and landscape. However, it is noted that the present invention could be practiced with printers that can only print in portrait and only print in landscape orientations, and with printers that are limited as to the size of the substrate being used (e.g. the printer could only print to 3×5 substrates, or only print to 3×5 and 4×6 substrates, etc.)

A feature of the kiosk 10 of the present invention is its ability to print an image associated with the image associated with the captured image captured by the image capturing device on a first side of a set number of substrates having a preprinted image on a second side of the set number of substrates, the preprinted image being unique from the preprinted image on the substrate printed to immediately before. Thus, in the case of a deck of playing cards, the kiosk would, by way of example and not by limitation, print to, say, a 5 of diamonds, and then print to a 6 of diamonds, although it is noted that there is not set order necessary, and that the kiosk could print to a 5 of diamonds, then to a 7 of spades, then to a joker, then to an ace of clubs, then to a 2 of clubs, etc. It is noted that while the preferred embodiment of the present invention supplies a full deck of 54 playing cards, the present invention can be practiced without a full deck, or a deck without, say, jokers, etc. It is noted again that the present invention is not limited to use with a deck of playing cards, as post cards and match books can be used in the kiosk as well. Basically, any type of print media could be used to practice the present invention. Further, it is noted that while much of this document refers to playing cards, the embodiments of this invention are not limited to playing cards. Basically, the present invention can be used to create or print to virtually any form of card, and that references to playing cards simply represent a preferred embodiment.

The kiosk 10 of the preferred embodiment is preferably adapted to provide a printed product that is of the same or substantially similar in quality to traditional playing cards, by way of example only and not by limitation, including but not limited to size, feel, texture, durability, water repellence/ resistance, etc. Thus, the printer 18 is preferably adapted to print to a substrate the same as or substantially similar to a playing card, and to produce an image that would be acceptable or substantially acceptable for a deck of playing cards. However, the present invention can be practiced with a device built in to the printer or provided with the printer that will laminate or coat at least a portion of at least one side of a substrate after printing to provide additional protection to the printed image. In a preferred embodiment of the present invention where the final product is a deck of playing cards, the kiosk could be adapted to provide a coating on the playing cards. This coating would improve the handling of the cards with respect to an uncoated card. By way of example only and not by way of limitation, a device could put a clear or substantially clear layer of plastic or other type of coating over the printed image, the coating being self-adhering to the substrate and/or printed image, or being adhered to the substrate and/or printed image via exposure to a stimulant, such as by way of example but not by limitation, an ultraviolet light that will solidify the coating.

The above coatings could be in a variety of grades, depending on the end-use. By way of example only and not by way of limitation, the coating could be used to change the paper brightness, the surface properties for better printed results, and/or to impart some functional property onto the cards (such as resistance to oil, grease, water, dust or additional markings, etc.).

As noted above, the present invention can be practiced by also utilizing substrates that are pre-coated. Thus, the printing device of the kiosk could be adapted to print directly onto these coated cards. By way of example only and not by way of limitation, light-weight coated stock or film coated stock, as they are sometimes referred to in the art, can be used. Alternatively, or in addition to this, techniques such as, but not limited to rod, blade and air knife coating could be used to coat the playing cards or substrate, depending on how the kiosk is configured. It is noted that the coating could be done on a single side or both sides of the substrate. Basically, any form of coating system or method that would provide a coating to improve the outer surfaces of the finished product in general, and to make the substrate much like a commercially available playing card in particular, can be used to practice the invention with regard to coating. Thus, any process currently known or later developed that could be used or adapted to be used in the present invention to impart a coating to the substrate before printing (whether it be with the kiosk or imparted on the substrate prior to placing the substrate into the kiosk) or after printing, or a combination there of, can be used.

It is further noted that a variety of coating formulations can be used as well. By way of example only and not by way of limitation, a mixture of pigments (such as calcium carbonate, clay or titanium dioxide) in a binder (usually a styrene-butadiene latex) could be used. Polycoated paper stock can be used as well. Coated paper stock having glass or high glass content can also be used. Again, it is noted that basically any coating formulation can be used to practice the invention, providing that it provides a coating on the cards or product.

Further, the present invention can utilize a die-cutting device or devices to produce the playing cards. In such an embodiment, the cards would be cut to desired dimensions, and then delivered to the user. This die cutting device could be a simple knife edge to form the card, or could be an actual die. The present invention is not just limited to rectangular shaped cards or product as well. By way of example, the present invention could be configured to cut cards to a triangular, pentagon, hexagon, or octagon configuration. Also, the present invention could be adapted to cut to non-symmetrical shaped configurations, as well as round, oval, circular shapes as well. Basically, the kiosk 10 of the present invention could be adapted to cut almost any size or shaped confiuration. Pre-perforated substrates in the shape of playing cards can be used in the present invention as well. These could be delivered to the user so that the user would then form the playing cards, or the cards could be prepared prior to delivery to the user. In such configurations, the kiosk could be configured with a trash receptacle to receive the waste from the die-cutting process and/or the perforations, and could also be equipped with a compactor to compact the waste.

Figure 7:
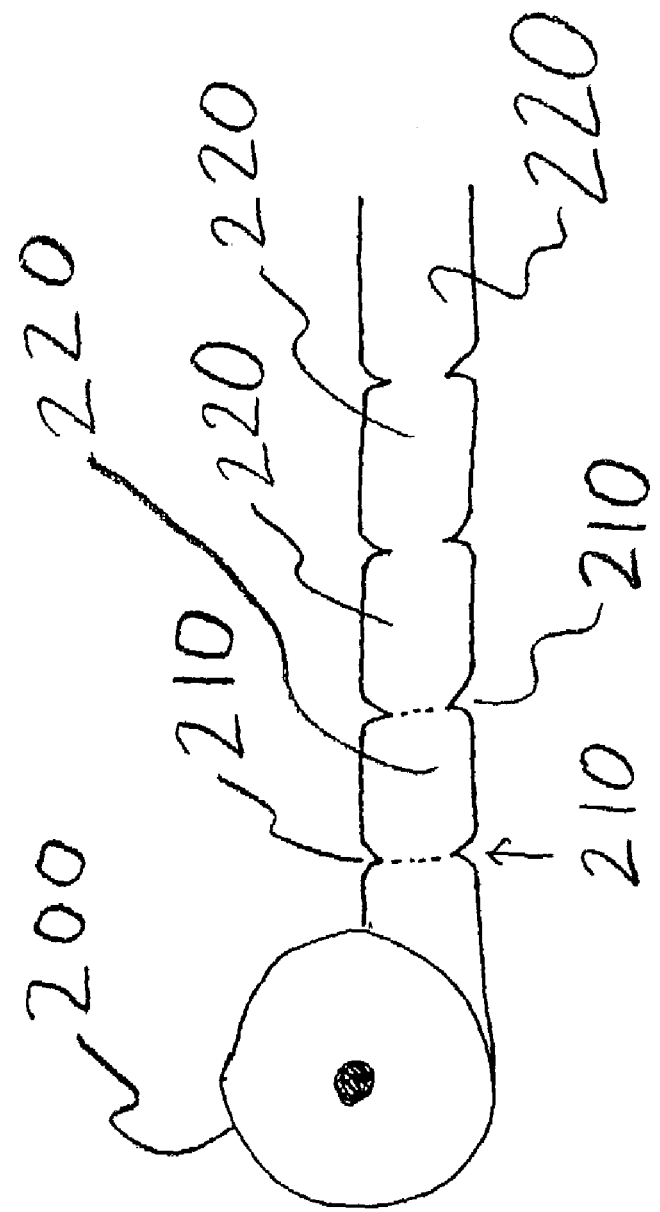
FIG. 7 schematically illustrates a scalloped roll of substrate that can be used in the present invention.

In another embodiment of the present invention, the substrate used in the kiosk is provided on a roll, such as by way of example a paper roll, and the roll is unrolled as the substrate is used. The kiosk could be adapted to measure or otherwise determine when a sufficient amount of substrate has been pulled from the roll, after which the desired portion of the substrate would be cut from the roll. Referring to FIG. 7, a roll of substrate can be seen 200. In the embodiment shown in FIG. 7, the substrate is scalloped at 210. In a preferred embodiment, this scalloping is performed in the preferred embodiment prior to placing the roll in the kiosk or with the kiosk. That is, the roll 200 comes pre-scalloped from the substrate supply company. This pre-scalloping will be beneficial, by way of example, in the case of playing cards where curved corners are desirable and such cutting could be difficult in some instances. Thus, in a kiosk utilizing a substrate roll shown in FIG. 7, the kiosk could be adapted to cut the substrate at the scalloped edges, thus separating each individual card 220. The kiosk could also be configured to collate and order these cards, and could also be configured to smooth the edges as well. It is further noted that the roll of substrate 200 does not need to be scalloped in the present invention. That is, the kiosk could produce a product with square edges. In such an embodiment, the kiosk could simply cut the individual cards 220 from an unscalloped roll. Further, the kiosk 10 could be configured with a device that would add the scalloping to the roll 200 prior to cutting, or could add the rounding after the individual cards 220 are cut. It is also noted that the kiosk could be adapted to cut sizes and configurations of cards other than traditional cards from the roll 200. By way of example, triangular playing cards could be cut from the roll 200. This would preferably be accomplished by cutting the roll 200 at an angle and then cutting at a different angle and then cutting at yet a third angle, or doing all three at once or in various orders.

The printer 18 of the preferred embodiment of the present invention is adapted to print an image associated with an image associated with a captured image captured by the imaging device. An image is associated with an image associated with a captured image captured by the imaging device if, by way of example only and not by way of limitation, it is an image that is an unmanipulated version of a captured image, a manipulated version of a captured image, or a manipulated version of a manipulated version of captured image, or a manipulated version of a manipulated version of a manipulated version of captured image, etc. Manipulation includes but is not limited to altering the background of the image or another form of manipulation as described below. Thus, the present invention can be practiced by printing the image captured by the imaging device, or by printing the image displayed by the display device (whether the image displayed on the display device is a manipulated image or an unmanipulated image of the image captured by the imaging device), or by printing a manipulated version of the image captured by the imaging device, or by printing a manipulated version of the image displayed by the display device, etc.

Figure 3:
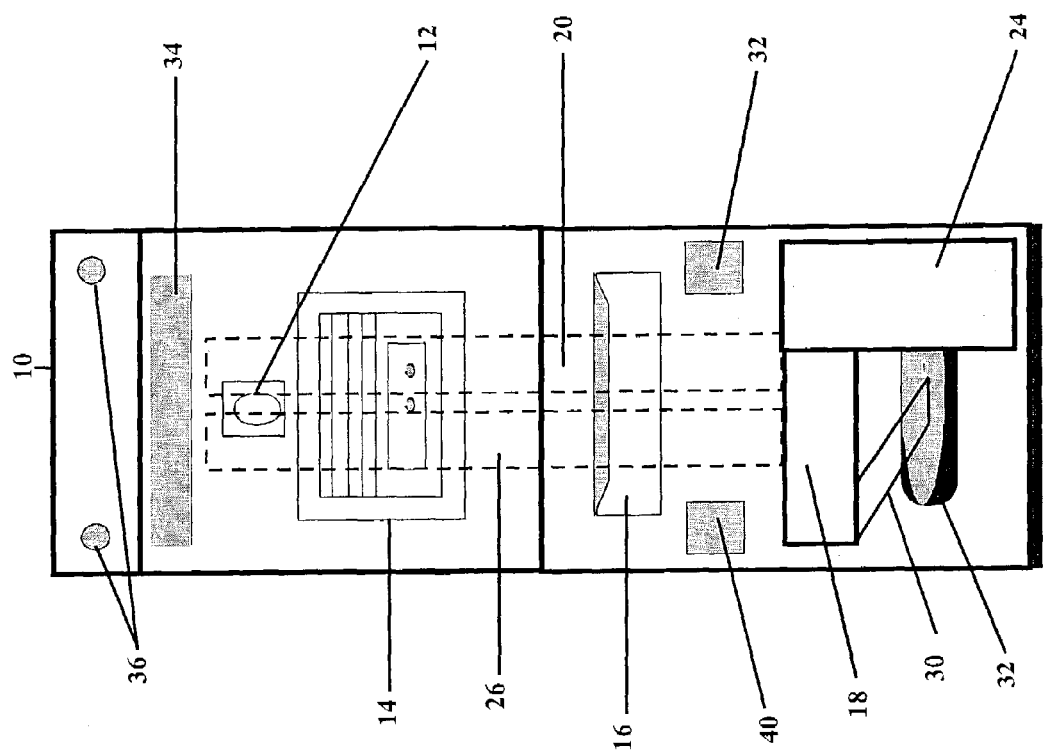
FIG. 3 schematically illustrates a kiosk according to the present invention as seen from the back.

FIG. 1 shows that the kiosk of the present invention has a substrate magazine 20 and substrate chute 22 which, in the preferred embodiment, collectively serve as a substrate handling device which is adapted to position a substrate in proximity to the printer so that the printer can print onto the substrate. FIGS. 1 and 3 show that the substrate magazine is generally vertical in direction and that the substrate chute 22 is angled into the printer. However, it is noted that other configurations of the substrate magazine and substrate chute 22 can be used to practice the present invention. By way of example only and not by way of limitation, the substrate magazine 20 can be horizontal or positioned at an angle from both the horizontal and vertical, and the substrate chute 22 can be horizontal or vertical as well, or positioned at an angle as seen in FIG. 1 or at another angle. While the substrate handling device is shown as a combination of the substrate magazine 20 and substrate chute 22, it is noted that the present invention can be practiced with a substrate magazine and substrate chute incorporated into one device, or the substrate chute can be done away with completely in the case where the substrate magazine is configured directly to feed to the printer. In another embodiment of the present invention, the substrate handling device is configured to be a rotary tray or platform with a plurality of divisions which could be configured to hold at least one substrate or a set of substrates. It is also noted that the present invention is not limited to a single size substrate, as noted above. By way of example and not by way of limitation, in the case where the roll 200 is used, the present invention could utilize multiple sized rolls. Further by way of example only and not by way of limitation, a roll dimension for a standard size playing card could be provided along with a roll for a oversized bridge card. It is important to note that various sized stocks can be used with not only the roll configuration, but the other substrate configurations as well. For example, paper of various pound stocks and size stock can be used. It is further noted that the exact configuration of the substrate magazine and/or the substrate chute are not critical to the present invention. That is, any substrate handling device which is adapted to position a substrate in proximity to the printing device such that the printing device can print to one or more substrates will be suitable to practice the present invention. The embodiments seen in FIG. 1 of the substrate magazine 20 and substrate chute 22 show only one of each component. However, it is possible to practice the invention with more than one substrate magazine and/or more than one substrate chute. By way of example only and not by way of limitation, such a configuration could be desirable in the case where multiple printers 18 are used in the kiosk. However, it is noted that multiple configurations can be used with a single printer as well, especially in the case where the kiosk is adapted to shuffle or reorder the substrates after they are printed. The substrate chute 22 is preferably configured to supply the printer with a substrate by positioning a single substrate in the printer one at a time. However, the present invention can be practiced with a substrate chute that supplies multiple substrates into the printer at one time. For example, a substrate chute which separates the substrates or aligns them, say, side-by-side and sends them through the printer so that the printer can print to multiple substrates at the same time can be used. Further, it is possible that the substrate magazine can be configured so that multiple substrates can be sent to the printer at the same time. This embodiment would negate the need for multiple substrate magazines and/or multiple substrate chutes. It is noted that the exact number of these components is not critical to the present invention and that any number of these components can be used to practice the invention so long as the printer receives substrates and can print onto the substrates.

While the embodiment of the present invention is shown with the substrate handling device positioned above the printer, embodiments of the present invention can be configured to have the device positioned below the printer as well, or anywhere that would allow the present invention to be practiced.

The substrate magazine 20 of the preferred embodiment is configured to dispense 54 playing cards as the substrate for every set of images to be printed. (This is to be discussed in greater detail below.) Thus, the substrate magazine 20 would have a device which would ensure that no more and/or no less than 54 cards were sent to the printer. This could be accomplished by a number of devices. By way of example only and not by way of limitation, the substrate magazine could have a metallic card placed after every 54 cards. The substrate magazine would further be configured with a metallic metal detector of some sort that would detect when this card comes near the sensors, thus generating a signal that 54 cards had been dispensed. This signal could be sent to the control unit 24 or could simply be used by the substrate magazine 20 to stop the dispensing of cards to the printer. Further by way of example and not by way of limitation, the substrate magazine could have an optical counter which generates a signal, optionally being sent to the computer 24, to determine that the proper number of cards have been sent to the printer. Alternatively, the substrate chute 22 could be configured with either of the devices just mentioned or the printer could be configured with the devices as well, or some other component of the kiosk can be configured with these devices, as long as an accurate count or determination of the number of cards that has been dispensed can be achieved. However, it is noted here that there are a number of other ways this could be accomplished and that basically any device or configuration that will provide a count of cards or aid in preventing more cards or less cards from being sent to the printer than desired can be used to practice the present invention. Additionally, it is noted that the 54 playing cards mentioned above is simply the number of cards that would be dispensed per printing in the preferred embodiment of the present invention. It is possible that fewer than 54 cards or more than 54 cards will be desired to be sent to the printer. Indeed, it is possible that only one card would be sent to the printer. This would be the case when the substrate is a customized postcard. (As discussed in greater detail below.)

As noted above, in another embodiment of the present invention, the substrate handling device is configured to be a rotary tray or platform with a plurality of divisions which could be configured to hold at least one substrate or a set of substrates. In such a case, the divisions could be configured to each hold a deck of cards, although each would not have to be configured to do so. Further, the divisions could hold a plurality of cards, thus allowing for the selective dispensing of various types of playing cards, although the other embodiments of the substrate dispensing device according to the present invention could be adapted to do so as well. By way of example only and not by way of limitation, the kiosk could be adapted to allow the user to select from a variety of different playing cards. In a kiosk with a rotatable tray, this embodiment could be practiced by having playing cards of one type in one division, and playing cards of another type in another division, the playing cards stacked one on top of the other or side by side or in any other order. In such a scenario, the rotateable disk could be configured to align the division containing the cards with a position to allow the selected cards to be sent to the printer, for example, by dropping or being pushed out the bottom or being pushed out the side or being taken out from the top. If another type of playing card was selected, the rotatable tray would rotate to have that division aligned so that the cards would be sent to the printer. It is noted that such a configuration is not limited to embodiments utilizing a rotatable tray, and the other embodiments of the invention can be configured to have a selective card system as well.

In regard to the size of the substrates, a preferred embodiment of the present invention can be used with substrates having a size of abut 3 and ½ inches by about 2 and ½ inches and a thickness of about 0.003 inches or about 0.005 inches or about 0.007 inches or about 0.01 inches or about 0.015 inches or about 0.02 inches or about 0.025 inches or about, 0.03, 0.035, 0.04, 0.045, 0.05, 0.055, 0.06, 0.065, or more, and any thickness in between, as well as combinations of thickness (i.e. the thickness could be variable. Further, the length and width of the substrates is not limited either, as smaller sized substrates and larger sized substrates can be used with the present invention as well. By way of example and not by limitation, the kiosk could be adapted to utilize 8 and ½ inch by 11 inch substrates, or substrates the size of match books. With this latter point in mind, the present invention can be configured to deliver substrates of non-uniform geometry, such as by way of example and not by limitation, match books and/or match boxes. In the case of match books, the kiosk could be provided with safety devices such as extinguishers. Of course, the printer could be configured to print to these substrates as well. Basically, the present invention can be configured to handle substrates having dimensions of less than about ½ inch by about ½ inch by about 0.003 inches to about 14 inches by about 17 inches by about 1 inch, and any size or range of size there between. Also, the substrates do not necessarily have to be in a rectangular format. By way of example, the substrates can have rounded edges, as in the case of playing cards, or be entirely round, or serpentine shaped as well. Basically, the kiosk can be adapted to utilize any size or shape substrate. Further, the present invention can utilize substrates dimensioned in metric units as well. By way of example and not by limitation, embodiments of the kiosk could be adapted to utilize triangular shaped substrates, or hexagon or pentagon or octagon substrates. Still further, the kiosk could be adapted to utilize substrates that are not symmetrical, and substrates that do not have straight sides (e.g. round, oval, circular, etc.).

FIGS. 1 and 3 also show that the kiosk of the present invention has a container magazine 26 connected to a container chute 28 and that container chute 28 is connected to or at least leads to the printer 18. In the preferred embodiment the container magazine 26 and container chute 28 are substantially similar if not the same in operating principal as substrate magazine 20 and substrate chute 22. However, the present invention can be practice with a container magazine 26 and container chute 28 that is different than the substrate magazine and the substrate chute. The container magazine 26 of the preferred embodiment would be configured to provide a single container for each set of playing cards dispensed by the kiosk. In one embodiment, the printer 18 or some other device positioned with the printer 18 would be configured to place the 54 playing cards with the printed image on the playing cards into the container and then the container would be delivered through the product delivery chute 30 and then to the product tray 32. However, recognizing that it may be cost effective to separately deliver a deck of playing cards to the product tray and separately deliver a container for the playing cards to the product tray, the present invention can be configured to accomplish this as well. In this embodiment, the user would place the cards into the container himself or herself. In such a case, it would be preferable to have some form of wrapping device to wrap the cards together so that the cards would not be loose when sent to the product tray 32. Although, the present invention could be practiced by dispensing 54 loose cards or any quantity of loose cards desirable to the product tray. It is also noted that the present invention must not necessarily be practiced with a container magazine dispensing device and that it is not necessary to provide containers to the user. The containers of the present invention (which are not shown in the figures) could be basically pre-formed plastic boxes or cardboard boxes, with a bottom portion which would serve as the male portion of the box and a top portion (a lid) which would serve as the female portion of the box. Alternatively, the containers dispensed from the kiosk could be pre-die-cut cardboard box embryo which would be dispensed to the user. In this embodiment, it would be up to the user to fabricate the box himself or herself, thus saving space in the container magazine due to the substantial flatness of the containers as opposed to containers that were pre-formed. Of course, in this embodiment, the cards would be delivered separately from the container as noted above. However, it is also noted that the present invention can be practiced with a device that would take the flat embryo container and assemble it into a box and deliver it to the product tray along with the deck of cards. Further, the present invention can be practiced with the just mentioned device whereby the cards are placed in the just made box prior to delivery to the product tray 32. Also, the present invention can be practiced with the embryos supplied in the substrate magazine 20, being positioned, for example, one after 54 cards. In such a configuration, the embryo could be used to signal that 54 cards have been dispensed.

It is noted that the above represents the preferred embodiment of the present invention, and that the present invention can be practiced with basically any device that will allow the kiosk to deliver a container to the user. Indeed, depending on the economies associated with providing containers, it is possible that the owner/operator of a kiosk would simply have the containers located separately from the kiosk such that the user of the kiosk could simply take as many containers as they would like. This would be the case when the container relatively cheap in comparison to the cost associated with configuring the kiosk to supply containers. Thus, a container magazine/chute is not necessary to practice the present invention.

It is noted that FIG. 1 shows the substrate chute attaching to the printer. However, it is noted that the substrate chute 22 does not necessarily have to be attached to the printer. That is, it is envisioned that at least in the case of the substrate chute or the substrate magazine, an intervening device could be placed in between the printer and the substrate chute. By way of example only and not by way of limitation, it is possible that the selected printer could be deficient in certain areas that would be desirable in regard to the printing of the cards. For example, it may be desirable to heat the cards to a certain temperature to speed the adhesion of ink and the curing of ink on the cards.

Further, it is also possible to practice the invention without even a substrate chute 22 or substrate magazine 20. By way of example only and not by of limitation, the kiosk can be configured so that the user provides a deck of playing cards or one or more other forms of substrate to the kiosk, (purchased from some other place or obtained as a complementary give-away from the location where the kiosk is located or from another location) and the user would then take these substrate(s) and put them into the kiosk machine. The kiosk would then supply the cards to the printer to be printed. In such a case, a device would be present in the kiosk to direct the substrate(s) to the printer.

It is again noted here that while the preferred embodiment of the kiosk supplies 54 playing cards to the user. The kiosk of the present invention can supply fewer cards to the user or supply other substrates to the user, such as a preprinted postcard. In the case of a postcard, the postcard would have a preprinted side with, by way of example and not by limitation, a view of a national park. The kiosk could be adapted to print on at least the reverse side, just as it is adapted to print on the first side of a playing card. Also, the kiosk could be adapted to print on the preprinted side as well, again just as the kiosk is adapted to print on the face side of a playing card. By way of example only and not by way of limitation, the kiosk 10 would be adapted to allow the user to have at least text be printed on the preprinted side, the text being either of the users selection or predetermined. It is noted that this text could be in both a variety of fonts, as well as a variety of languages.

The kiosk of the preferred embodiment also includes an electronic control unit 24 in the kiosk. The control unit 24 of the preferred embodiment is in electronic communication with the information suite in general, and in particular the display device and/or the touch screen. It is noted that the preferred embodiment of the electronic control unit 24 utilizes a computer. However, this is not to be considered a limitation and it is further noted that the control unit 24 includes but is not limited to a general processor or any device that can provide simple control logic. Basically, the electronic control unit 24 can be anything that controls at least one of the components of the kiosk utilizing some form of logic.

The control unit 24 of the preferred embodiment is adapted to receive and send information from the touch screen 16 and to the display device 14, respectively. If the touch screen is embodied in the display device, the control unit 24 would be adapted to receive information from the display device as well. The control unit 24 of the present invention can be configured to control the kiosk based entirely on input from the user or based entirely on a predetermined routine, which, in the case of a computer, could comprise software, and in the case of a processor, could comprise firmware. It is further noted that the control unit 24 of the present invention can control the kiosk based on a combination of information inputted from the user as well as based on a predetermined routine. For example, the control unit 24 of the present invention can be configured to operate various components of the kiosk based on a time table which begins with the sensing of the presence of a user followed by the display of instructions directly to the user coupled with a signaling mechanism of some sort, such as a timer counting down to zero in combination with instructions to the user as to what to do or where to position the user(s) face or faces or other in the case of multiple users. Alternatively, the control unit can be configured to simply receive information from a user, only then signaling one or more components of the kiosk to perform an operation. Thus, in this configuration, nothing would happen until the user provides input to the kiosk, and then only one function would occur, after which the kiosk would be idle until the user inputs other information. In the case where the electronic control unit 24 controls the kiosk based on a combination of information from the user and a predetermined routine, the kiosk could be configured, for example, to await input from the user that, for example, the user is ready to have his or her image electronically captured, after which the controller 24 would instruct the imaging device 12 to capture the image, after which the controller 24 would display the image on the display device or, by way of example and not by way of limitation, instruct the user to position himself or herself for another image capturing event, after which the controller would display the plurality of images captured on the display. In the case of the former, the controller would then instruct the substrate magazine 20 to deliver cards to the printer to begin printing without the input of the user, or in the case of the latter, the controller 24 could prompt the user to approve the images after which the controller 24 would instruct the substrate magazine 20 to deliver cards to the printer and then instruct the printer to begin printing. It is noted that the just described options are simply examples of preferred embodiments and that it is not necessary for the controller 24 to control, for example, the imaging device. In such a situation, it is expected that the user would be provided with a input mechanism which could include, by way of example, a mechanical device such as a device that would be operated by the users foot and directly linked to the imaging device or would send a signal directly to the imaging device to instruct the imaging device to capture an image.

Further, the controller 24 could also be configured with a timer to time the time between user inputs. In such a case, a predetermined time between imputs could be identified, thus the timer could be used to signal that the user is no longer interested in using the kiosk, at which point the kiosk would be reset so that a new user could use the kiosk. Also, the kiosk could be configured to sense when a user walks away from the kiosk, thus resetting the kiosk.

The kiosk of the preferred embodiment will be equipped with a light bar 34. A light bar of the preferred embodiment would highlight the user so the imaging device will be able to capture a better image of the user. Also, the light bar helps the imaging device focus on the user or users.

The kiosk 10 of preferred embodiment can also be provided with speakers which will convey audio information to the user and/or convey music to the user. The speakers could be in communication with the control unit 24 and thus would receive signals from the control unit 24 wherein the signals would include music signals or verbal audio signals comprising verbal language which would include instructions to the user. Alternatively, it is possible to practice the invention with the speakers 36 connected to an audio device, such as a compact disk player or a analog tape machine or even a hard drive for a computer (utilizing, for example, MP3 technology). In such a situation, the electronic control unit 24 could simply control the audio equipment containing the prerecorded messages and/or music. It is noted that it is not necessary for the electronic control unit 24 to be in communication with the speakers. The speakers could be controlled by some other device.

Figure 2:
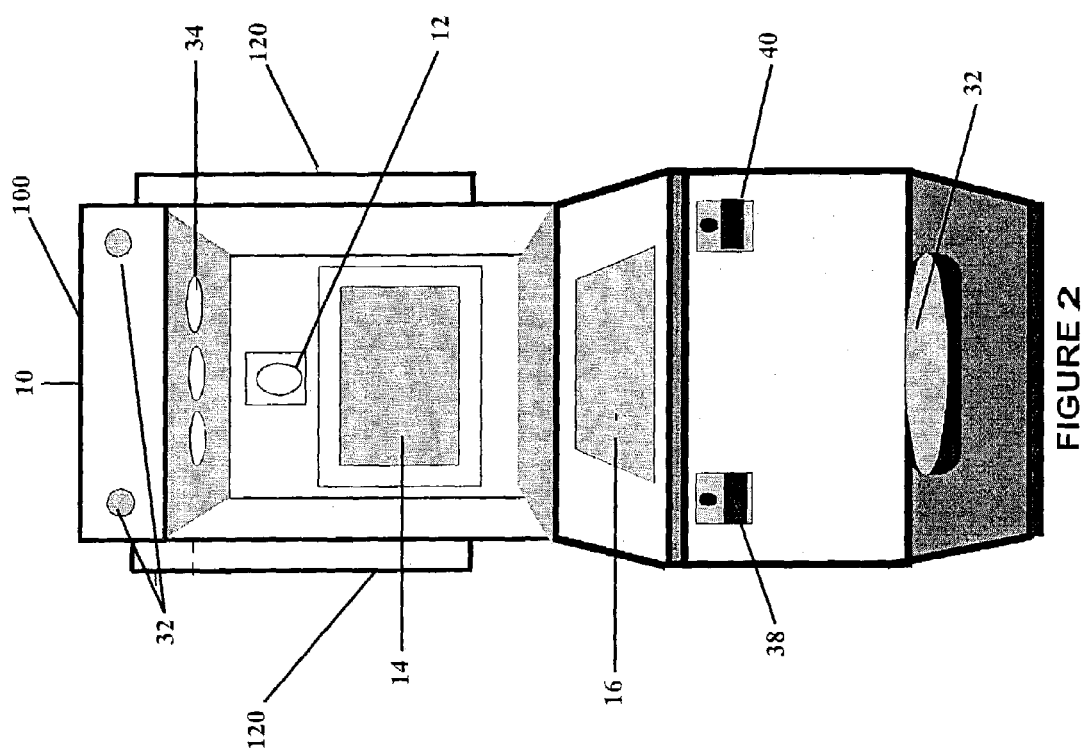
FIG. 2 schematically illustrates a kiosk according to the present invention as seen from the front.

As seen in FIG. 1 and further seen in FIG. 2, the kiosk 10 of the present invention includes a card acceptor 38 and a bill acceptor 40. The card acceptor 38 will be adapted to accept, in the preferred embodiment, various forms of credit cards, debit cards, ATM cards or any other form of card that is used in place of currency. The currency acceptor 40 will be configured to accept American currency in the form of change or bills (i.e. one dollar, two dollar, five dollar, ten dollar, 50 dollar and/or 100 dollar bills or bills of even large denominations). Further, the currency acceptor 40 could be adapted to accept currencies of other nations as well. The currency acceptor of the preferred embodiment would accept American currency, however a currency acceptor that accepts both American currencies and foreign currencies such as, by way of example but not by way of limitation, euros or yen or pesos could be used to practice the present invention.

The kiosk 10 of the present invention would preferably have its components located in an outer cabinet 100, which is preferably supported by casters 110 as seen in FIG. 1. These casters 110 could be lockable in some embodiments (either in the swivel direction or the rotating direction, or both), and could retract in other embodiments (the retraction could be lockable as well), or both. However, the present invention is not limited to lockable casters. Basically, any configuration that can make the kiosk secure or substantially secure or more difficult to move can be used to practice the present invention.

The kiosk 10 of the present invention will preferably be configured to permit text to be printed along with the image captured and printed on the substrates. This text could be inputted into the kiosk by the user utilizing the communication suite's touch screen 16 and/or other mechanical text inputting needs. In a preferred embodiment, the kiosk 10 would be configured so that the user could simply speak the text into the kiosk. The kiosk would then receive the text, convert it to a text image on the display screen 14, and request that the user confirm whether the text is correct. The control unit 24 of the present invention would position the text in conjunction with the captured image that would be printed on the substrate. This text would be displayed on the display device 14 prior to printing on the substrate so that the user could confirm the location of the text and the accuracy of the text. In a preferred embodiment, the kiosk could be configured to allow the user to move the location of the device via a touch screen system. That is, the user could simply point to where he or she prefers the text to be positioned and the control unit would position the text accordingly. The kiosk could be adapted to allow the user to rotate the text, change the font of the text, or basically do anything to the text that could be done to the text on a common personal computer, such as, change the boldness, add underlying, italicize, stretch out, etc. It is noted that the kiosk of the present invention can include pre-written text, text passages, etc., that can be displayed to the user. The kiosk would be adapted to allow the user to select the pre-identified text passages. Thus, the kiosk of the present invention could allow the user to input text or to simply select text. Additionally, the present invention could be practiced whereby the kiosk provides some of the text to be printed on the substrate while the user provides other portions of the text to be printed on the substrate.

The kiosk of the present invention will be configured to capture one or more images of the user or users. These images can be stored in the control unit 24 or other memory device located separate from, in communication with or not in communication with the control unit 24. The kiosk would be configured to display one or more of these images at the same time on the display device 14, by way of example only and not by way of limitation, via a horizontal split screen, vertical split screen, or multiple split screens shown on the display device 14. This could be accomplished by reducing the size of all of the display images to accommodate multiple display images. That is, by way of example and not by limitation, two images shown on the display device would each take up half as much room as one single image. The kiosk of the present invention would also allow the user to deselect and select images depending on preference. That is, for example, if the second image captured is more desirable than the first image captured, the kiosk could be adapted to allow the user to input that the user only desires to store the second image and not the first image. In such an scenario, the kiosk would be adapted to take additional images of the user as well, and this selection process could be repeated until the user has a sufficient number of images displayed and then the user could delete additional images until a single image is identified as desirable to be printed on the substrates.

The kiosk of the preferred embodiment also includes an image manipulating device which allows the image captured by the image capturing device 12 to be manipulated. By way example only and not by way of limitation, the image manipulating device would allow the background of the image to be deleted and/or replaced with some other form of background, such as a forest or a casino floor or a race track, and could also include but is not limited to backgrounds including pre-imaged pictures of people, such as pre-imaged pictures of aesthetically pleasing people in suggestive poses. In such an scenario, only the face and only the body of the user would be seen. Background replacement would be desirable in the case of a kiosk where there is no background board and thus the kiosk could capture images of people passing behind the user. Also, the present invention can be practiced by altering the background or replacing some of the background and altering the remaining background, or imaging over some of the background, and displaying the remaining background. The image manipulating device would also be adapted to change the height and width of the image so that the image could be best printed on the substrate. This is desirable in the case of printing to a card where the substrate is a card from a deck of playing cards which provides more horizontal space than vertical space, as opposed to a postcard which, might provide more vertical space to print than horizontal space to print. Image manipulating device could allow the color or grayscale of the image to be manipulated. The preferred embodiment could be configured to allow the user to adjust one or more aspects of the captured image and/or images. This manipulated image could be stored in a memory device in the kiosk just as the raw captured image could be stored in a memory device in the kiosk. Basically, image manipulating device could include anything that would allow the captured image to be manipulated. In a preferred embodiment, image manipulating device could be linked with advanced software which would remove such features as, for example blemishes and warts, from the face of a user. Alternatively, or in addition to this, it could be used to automatically smooth out wrinkles from the face of the user. Also, the present invention could be configured to remove image capturing induced features, such as but not limited to, red eye, from the captured images as well. With this in mind, the kiosk 10 of the present invention could be configured with software such as but not limited to Photoshop that will allow the overall image to be touched up. Touchup to the images could be done automatically, or case by case, as the user directs.

It is noted that the kiosk would be adapted to automatically manipulate the image in one or more ways as well as to allow the user to manipulate the captured image in one or more ways and that the kiosk in the preferred embodiment would be configured to allow both the user to manipulate the image and to have the image manipulated automatically.

In the case of automatic manipulation, the control unit 24 could control the manipulation of the image.

The kiosk 10 of the preferred embodiment would also allow for the display of advertisements to the user and/or other passersby. For example, the kiosk can be configured with side panels 120, as seen in FIGS. 1 and 2, located on the left and right sides of the kiosk and extending outward around or at least substantially towards the user. These side panels could have flat screen monitors similar to or the same as the monitor of display device 14. The monitors of the side panel 120 could display advertisements preprogrammed into the kiosk or fed into the kiosk by a remote link which is discussed further in greater detail below. Thus, by way of example only and not by way of limitation, a scenario where the user is standing in front of the kiosk and having his or her image captured would see to the left of the user an image for an advertisement for a restaurant displayed on the left side panel and to the right the user sees on the display an advertisement for a hotel on the right side panel. These displays on the monitors on the side panels could be changed frequently or infrequently, and the side panels could include multiple displays as well. This could be accomplished using split screen technology in a single monitor or having multiple monitors placed on the side panels or both. These side panels can be used to advertise the kiosk as well, such would ideally be positioned such that passersby could see them. This leads to another point, the side panels could have displays positioned on the outside away from the users, in addition to or as an alternative to the displays on the inside, so that passersby could see but the user may not be able to see. As noted above, the kiosk of the present invention could include speakers 36. The kiosk could be configured so that information presented to the user or other information presented to passers-by is synchronized with the speakers 36 thus allowing the sounds from the speakers to be synchronized with the information advertisements displayed on the side panels of the kiosk. It is noted that the advertisements displayed on the kiosk could include advertisements that are animated and/or contain video elements or are entirely composed of video. That is, the advertisements could be similar to or the same as television advertisements. In some embodiments, these advertisements could incorporate captured images that were captured in real time or near real time by the kiosk.

It is further noted that the display 14 can be configured to display advertisements while the kiosk is being used by the user which, by way of example and not by way of limitation, could be accomplished using a split screen or by showing the advertisement immediately prior to the user positioning himself or herself in front of the kiosk or could be displayed while the user is waiting for the kiosk to process one or more functions or one or more commands or even to print to the substrate.

Additionally, it is noted that the kiosk of the present invention can be configured to display images to attract the attention of passers by. By way of example only and not by way of limitation, the kiosk could have a display or a plurality of displays positioned on top and/or on the side and/or on the back and/or any other suitable place of the kiosk that would display an advertisement, as well as be configured to display advertisements on the screens of the information suite, ad discussed above. In another embodiment, the kiosk can be configured to capture an image of one or more passers by and display that image and/or a manipulated version of the image on the display(s) with or without associated text. It is also noted that these could be moving images as well. The images displayed by the kiosk could include advertisements that are animated and/or contain video elements or are entirely composed of video. That is, the advertisements could be similar to or the same as television advertisements or computer advertisements. Software packages that utilize animation, such as but not by limitation, Power Point by Microsoft, could be used as well. In some embodiments, these advertisements could incorporate captured images that were captured in real time or near real time by the kiosk. In other embodiments, these images could be prerecorded or precreated. In some embodiments, the advertisements would use motion to attract attention.

The kiosk 10 of the preferred embodiment is a self-contained stand alone device. However, other embodiments of the kiosk are envisioned in which the kiosk is controlled or partially controlled from a remote location or, alternatively, at least information is communicated from the kiosk to this remote location and/or information from this remote location is communicated to the kiosk. Information communication can be accomplished via the internet, for example, or via telephone optical lines, telephone electrical wire lines, satellite broadcast, cellular broadcast or RF broadcast, etc. The information communicated from the kiosk could include status messages about the kiosk's status, such as by way of example, the amount of substrate left in the kiosk, or whether there is a jam in the printer, etc. The kiosk of the present invention can utilize any existing data transmittal regime or future developed data transmission regime for both two-way communication and/or one-way communication. Also, the present invention can have the ability to receive software upgrades either via remote transmittal to the kiosk, or via uploading the software at the kiosk via the use of a software transmittal device, such as but not limited to a computer. This device could utilize a communications cable, or could utilize wireless communications, such as an IR device, as well.

The kiosk 10 of the present invention could even practiced whereby the control unit 24 is located at a remote location away from one or more components of the kiosk. Indeed, it is envisioned that other components in addition to the computer 24 can be located remotely from portions of the kiosk. By way of example only and not by way of limitation, a kiosk according to the present invention is envisioned whereby the imaging device 12 is located at one location, say hard mounted to an outdoor structure such as a pillar or a corner of a building, and the information suite would also be mounted on or substantially next to the building, and the computer 24, printer 18, and the associated components used to deliver the substrates to the printer 18, would be located at an area away from the image capturing device. In such a situation, the image captured by the image capturing device would be sent to the control unit or other memory unit remotely by one of the above mentioned methods (e.g. phone line or wireless broadcast, etc.) and the instructions to manipulate the image, if there are any instructions, could be inputted from this location as well and directed to the remote location whereby the image could be manipulated. Further the image could be printed at this remote location or even at a third location. In such a scenario, the printed card or cards could be mailed to the user or placed at a location for the user to later retrieve these cards. Further by way of example and not by way of limitation, the kiosk device could have only the image capturing device located with the user and all the other components could be located at a remote location. The present invention could include any locational permutations of the components of the kiosk discussed in this specification.

The kiosk of the present invention could be mobile or at least a portion of the kiosk could be mobile, thus allowing the kiosk to be moved from location to location. By way of example only and not by way of limitation, the kiosk 10 could be built into the side of a truck or could be located inside a truck so that it could be driven to events. The kiosk could be configured to be easily handled by a device such as a forklift or a crane, in which case it could have a connection point located at the top or connection points located at the side to balance the load. Of course, the kiosk of the present invention could be configured to be waterproof and/or weatherproof. This would be desirable in the case of kiosks placed in wilderness areas or the like placed outdoors in wilderness areas of the like.

The kiosk 10 preferably would be configured so that it would record what it has printed and/or captured. That is, it could record the images modified or unmodified and/or text printed onto the substrates. This information would be useful in the event of, for example, the user desiring additional cards or duplicate cards or replacement cards. To accomplish this, the kiosk could be configured to electronically broadcast the recorded printings and/or images to a central location periodically or instantaneously via any one of the just mentioned communications modes or any other appropriate mode that would enable the information to be transferred from the kiosk. Of course, the information could be stored until the kiosk is prompted to transfer this information as well. Alternatively, the kiosk would be adopted to query the user as to whether or not the user would like the kiosk to retain the image and/or text for future reference. In an alternative embodiment, the kiosk would have a port to download this information to a disk or other recording means. In such an embodiment, the kiosk would be serviced manually.

As noted above, the kiosk 10 of the present invention utilizes a high speed printer. However, even in the case of a high speed printer, a situation may arise whereby the user will not want to wait for the cards to be printed, or as also could be the case, multiple users will desire to use the kiosk and it would be inefficient to have the users waiting until the cards are printed. Thus, to maximize both the number of users and to maximize the users' options, the kiosk of the present invention could be configured with a device that would store the cards so that the user can later retrieve the cards. By way of example only and not by way of limitation, this storage device could be similar to or substantially the same as or the same as a device which is commonly found in cafeterias which holds and stores pre-prepared food, i.e., sandwiches, cans of soup or soft drinks. These devices will rotate, for example, to a certain location which will allow the user to open the door and access one item. The same principle and theory of operation could be used to supply the user with the cards, thus preventing one user from obtaining the cards of another user. This device could be integral with the kiosk or located separately from the main components of the kiosk. Of course, any device or combination of devices which would allow the user to later pick up cards and optionally provide a security feature to prevent other users from obtaining the users' cards can be used to practice the invention. By way of example only and not by way of limitation, the kiosk could issue the user a pass code, either visually or on a ticket dispensed from the kiosk. The code would later be inputted into the dispensing device, allowing the user to retrieve the cards. This code could also be in the form of a magnetic strip, or a series of scan code bars.

In another embodiment of the present invention, the kiosk could be adapted to provide a reference number on one or more of the cards which would be recorded by the kiosk, thus enabling the user to obtain additional cards based on the reference number.

The kiosk 10 of the present invention is preferably powered by standard 110 volt or 220 volt electrical power supplied from a traditional wall outlet, as well as electrical power from non-United States sources as well, such as by way of example and not by way of limitation, European electrical power systems, and Asian electrical systems. However, the present invention can be practiced with, and include a solar cell array, a fuel cell, a windmill generator, or a fossil fuel generator, thus freeing the kiosk from reliance on a power grid.

Figure 6:
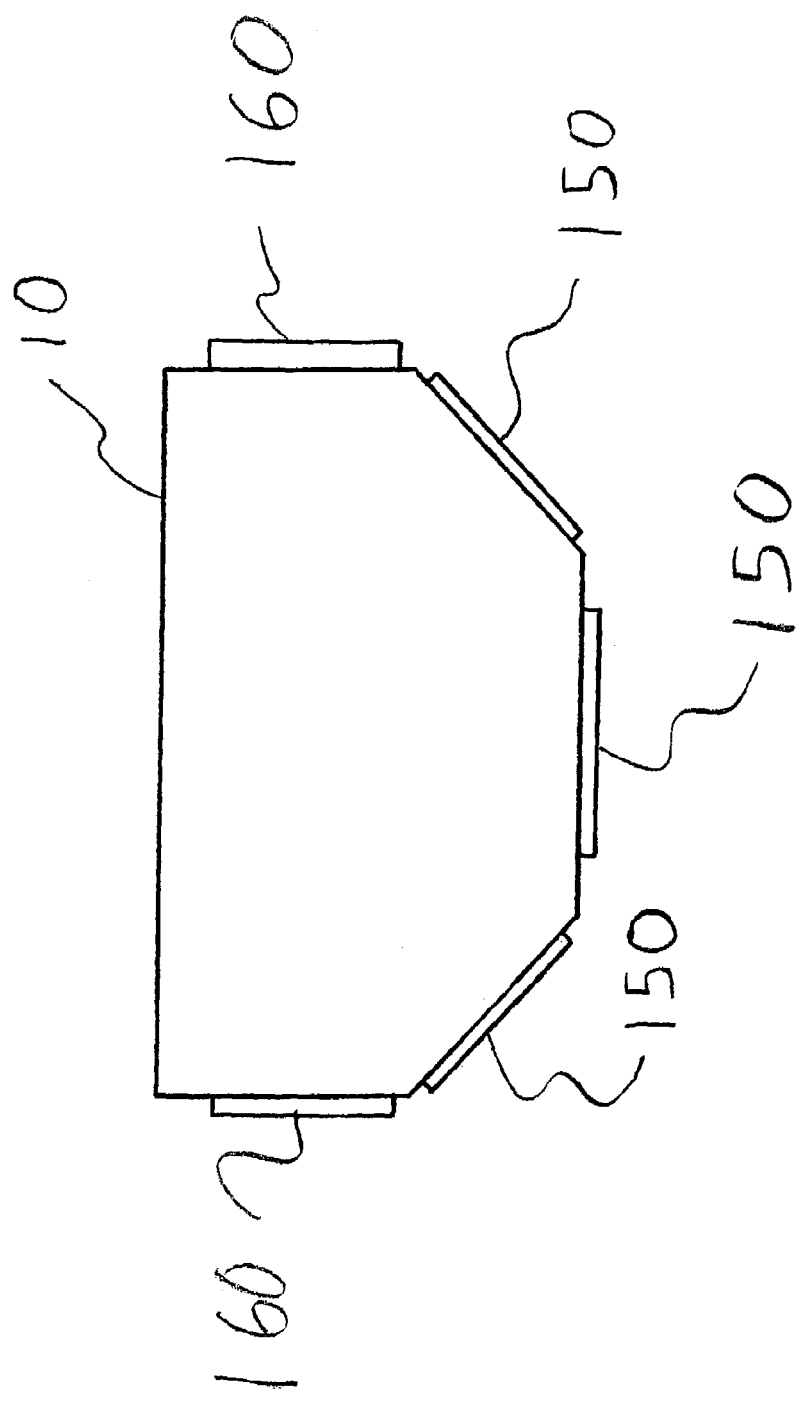
FIG. 6 schematically illustrates a kiosk according to another embodiment of the present invention.

In another preferred embodiment of the present invention, as seen in FIG. 6 (showing a top view of a kiosk of the present invention) a kiosk in which all the components of the kiosk are together, or a kiosk in which at least one component is located remotely from at least one other component, has a plurality of user stations 150 to permit a plurality of separate users to utilize the kiosk at the same or substantially the same time. In the preferred embodiment, by way of example and not by way of limitation, each of the user stations 150 have an imaging device, a display device, and a user interface. It is noted that while FIG. 6 shows three user stations 150, embodiments of the present invention can have fewer than three or more than three stations. By way of example and not by limitation, a kiosk of the present invention can have 1, 2, 3, 4, 5, 6, 7, 8, 9, 10, 11, 12, 13, 14, 15, 16, 17, 18, 19, or 20 user stations, and can have more than 20 user stations as well. Further, the kiosk of the present invention can be configured to be expandable, thus allowing the addition of user stations, as well as the retraction of user stations. Thus, the kiosk can have a number of user stations ranging from 1 to more than 20, and in any range in between (e.g. 2–19, 5–10, 4–8, etc.) It is noted that in the case of kiosks that have at least one component remotely located from at least one other component, hundreds, thousands, tens of thousands, and hundreds of thousands, and even millions of imaging devices and/or information suites and other components can be associated with one kiosk. The kiosk 10 of the this embodiment could also allow for the display of advertisements to the user and/or other passersby (by way of example as described above). For example, the kiosk can be configured with side panels 160, as seen in FIG. 6, located on the left and right sides of the kiosk. These side panels could have flat screen monitors similar to or the same as the monitor of display device 14. Of course, the monitors could be connected directly to the kiosk as well. The monitors of the side panel 160 could display advertisements preprogrammed into the kiosk or fed into the kiosk by a remote link. These panels 160 could extend around the users as well. Thus, by way of example only and not by way of limitation, a scenario where the user is standing by the kiosk and having his or her image captured could see to at least one side of the user an image for an advertisement for a restaurant displayed on the left side panel and to the right the user sees on the display an advertisement for a hotel on the right side panel. These displays on the monitors on the side panels could be changed frequently or infrequently, and the side panels could include multiple displays as well. This could be accomplished using split screen technology in a single monitor or having multiple monitors placed on the side panels or both. These side panels 160 can be used to advertise the kiosk as well, such would ideally be positioned such that passersby could see them, as shown in FIG. 6. Alternatively or in addition to this, the kiosk 10 could use the positions shown occupied by elements 160 as additional user stations.

In the embodiment just discussed where the kiosk is adapted to be used by a plurality of users at the same time, the kiosk can be provided with a plurality of substrate handling devices and printing devices to facilitate product delivery. In a preferred embodiment, there is a one to one ratio of these components to the information suites, however a higher or lower ratio can be provided. Basically, the present invention can be practiced with a kiosk having only 1 of these components to 20 or more of these components, regardless of the number of information suites.

As noted above and repeated here, the components of the kiosk is not limited to the embodiments disclosed herein. However, some embodiments of the kiosk can use, by way of example and not by limitation, various commercially available components and/or supply materials. Some embodiments of the present invention could use inks such as the HDP 710 and HDP 720 inks by Fargo Corporation. These inks could be used by the HDP dye sublimation/resin thermal transfer printing method. A digital camera and digital printer, such as the Advantage System from Fargo Card Printing Incorporation could be adapted for use in the present invention. The finished product produced by the kiosk 10 of the present invention could use dye sublimation/ thermal transfer print technology by Fargo. Other embodiments of the present invention could use plastic cards or plastic card technology, such as that which is available from On Time Plastic Imaging Company. Still, further embodiments of the present invention could use comb and heat set web printing combined or separately from dye cutting and foil stamping, wire braiding, case binding and coatings which could include aqueous coatings, ultraviolet coatings and laminations of the traditional sense. In the case of UV coatings, some embodiments of the present invention will use coatings that have a low silicon content, as a high silicon level could cause poor adhesion between the ink and the UV coating. Other card printers could be used, or adapted, for use in the present invention as well, such as the Presona C25 card printer form the Provantage Company. In one embodiment of the present invention the Presona C25 card printer would be used or adapted for use in the kiosk 10. It is noted that the kiosk 10 of the present invention could be adapted so that the kiosk could detect when a finished product does not meet certain quality requirements. Such a detection system could be incorporated into the kiosk 10 by utilizing technology from the Fargo Corporation in regards to their Persona C11 and M11. The present invention could utilize RAM-batch printing. The present invention could also be adapted with a printer or other device so that the size of the printing is scaleable, depending on the type of substrate used. Another embodiment of the present invention could utilize the Mitsubishi CP-700DU sublimation printer. Still, further embodiments of the present invention could utilize the Kodak ML-500 digital photo printer. Still, other embodiments of the present invention could possible use the Altron P310 printer. Basically, a preferred embodiment of the present invention would utilize high speed printing along with high speed imaging devices. That is, a preferred embodiment of the present invention would be able to produce products very quickly.

Figure 4:
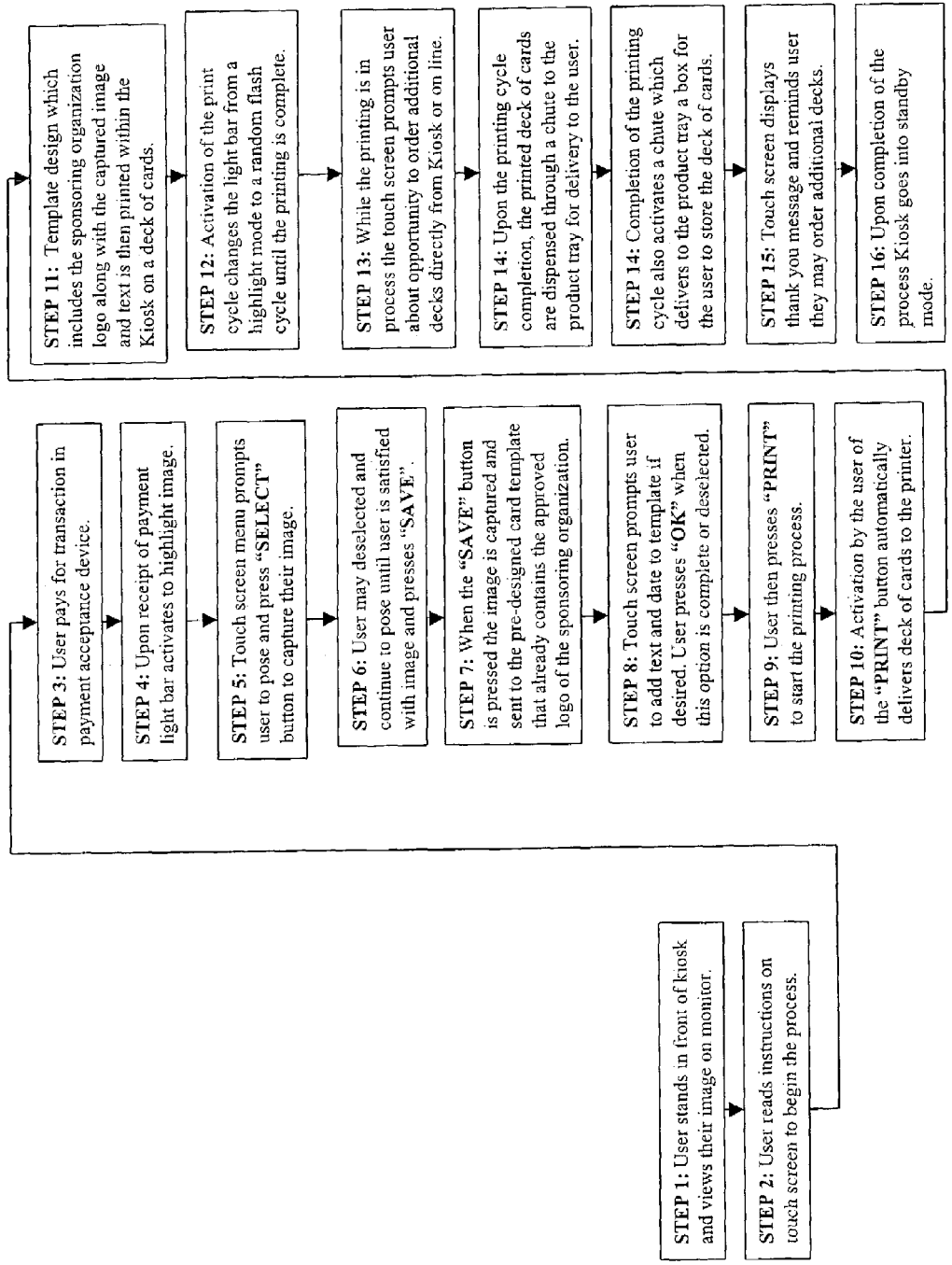
FIG. 4 shows an operational flowchart applicable to the kiosk of the present invention.

Exemplary Sequence of Operation of a Preferred Embodiment of the Kiosk of the Present Invention An exemplary sequence of operation of a preferred embodiment of the kiosk of the present invention is illustrated in FIG. 4., which shows by way of example only and not by way of limitation the process from start to finish of operating the kiosk. It is noted that the present invention includes any device or devices or components needed to practice these steps as would be known to one of ordinary skill in the art and are incorporated by reference herein in their entirety, and that these devices/components known to one of ordinary skill in the art could be combined or be separate devices/components to accomplish a single step or to accomplish multiple steps, whether in sequence or out of sequence, by a combination of the devices/components known to one of ordinary skill in the art or by the individual devices/components known to one of ordinary skill in the art. Step 1: The user standing in front of the kiosk views their image on the monitor 1 Step 2: The user reads instructions for operation of the kiosk 10, which are visible on the touch screen 2 which explains how to begin the process. To activate the kiosk 10, the user follows the prompts for operation, which are displayed, in menu form, on the touch screen 16. Stored instructions are synchronized as visual prompts on the touch screen 16 and reinforced with voice commands through the speaker system 36.

The user is prompted by the touch screen 16, and speakers 36, to select a form of payment. Step 3: The user then inserts currency into the bill acceptor 40, or credit/debit card 40 into the credit card acceptor 40 or other forms of accepting payment which also may be provided in the future such as wireless payment input. After payment has been received and accepted, the process within the kiosk 10 begins.

After payment acceptance Step 4: the light bar 34 highlights the user standing in front of the kiosk 10. The menu on the touch screen 16 prompts the user Step 5: to pose and press the "SELECT" button to capture their image. The image of the user is displayed on the monitor 14. Step 6: Using the touch screen 2 the user is prompted to either "SAVE" the image or press "DESELECT" and pose again repeating the process until the user is satisfied with the results and presses the "SAVE" button on the touch screen 16.

When the "SAVE" button Step 7: is pressed on the touch screen 16, it causes the controller 24 to store the image on a disc and places the image in a pre-designed template that contains the logo of the sponsoring organization. The combined image is then shown to the user on the monitor 14.

Step 8: The user is then prompted by the message on the touch screen 16 that limited text and a date may be added to the template design if desired. User may type in text or press decline. The user may also accept the date, which is pre-programmed in the software in the control unit 24 or press decline. When complete the user then presses "OK" on the touch screen 16.

Step 9: The touch screen 16 then prompts the user to press, "PRINT" to start the printing process. Step 10: The system makes a deck of cards available to the printer 18 from the substrate magazine 20 through the substrate chute 22. Step 11: The template design which includes: the sponsoring organization's logo, the user's captured image, date and text is then printed in color within the kiosk 10 on a first side of one or more cards in a deck of cards. The second side is pre-printed in standard playing card format prior to being inserted into the substrate magazine 20 of the kiosk 10. The printer is the kind currently available that will produce a high quality, color digital image on card stock with fast drying ink. Other types of printers capable of producing a hard copy quick print digitally stored image on card stock may also be used in the apparatus of the kiosk 10. Such printers are well known in the art and the operation thereof will therefore not be further explained here.

While the color printing is in progress, the touch screen 16 or monitor 14 shows a count down graphic that keeps track of the progress from the beginning of the printing process to completion and delivery of the deck of cards to the user. Step 12: Activation of the printing command changes the light bar from a highlight mode to a random flash cycle until the printing is complete. The entire process is carried out while the user waits. All of the steps in the printing process are coordinated through the software program in the control unit 24.

During the printing process, Step 13: the computer software also activates a message on the touch screen 16 prompting the user to order additional decks directly from the kiosk 10 or on line at the owner's web site. The user's image, text information, date, and time of transaction are digitally stored in the controller 24 and are assigned a reference number, providing the opportunity for the user to place orders for additional decks of cards using that reference number.

Step 14: Upon completion of the printing cycle, individual cards are dispensed from the printer 18 through delivery chute 30 to the product tray 32 for delivery of the complete deck of cards to the user.

Step 15: The end of the printing cycle triggers a container, for storage of the deck of cards, to be dispensed to the container magazine 26 through the container chute 28 into the product tray 32 for the user.

Figure 5:
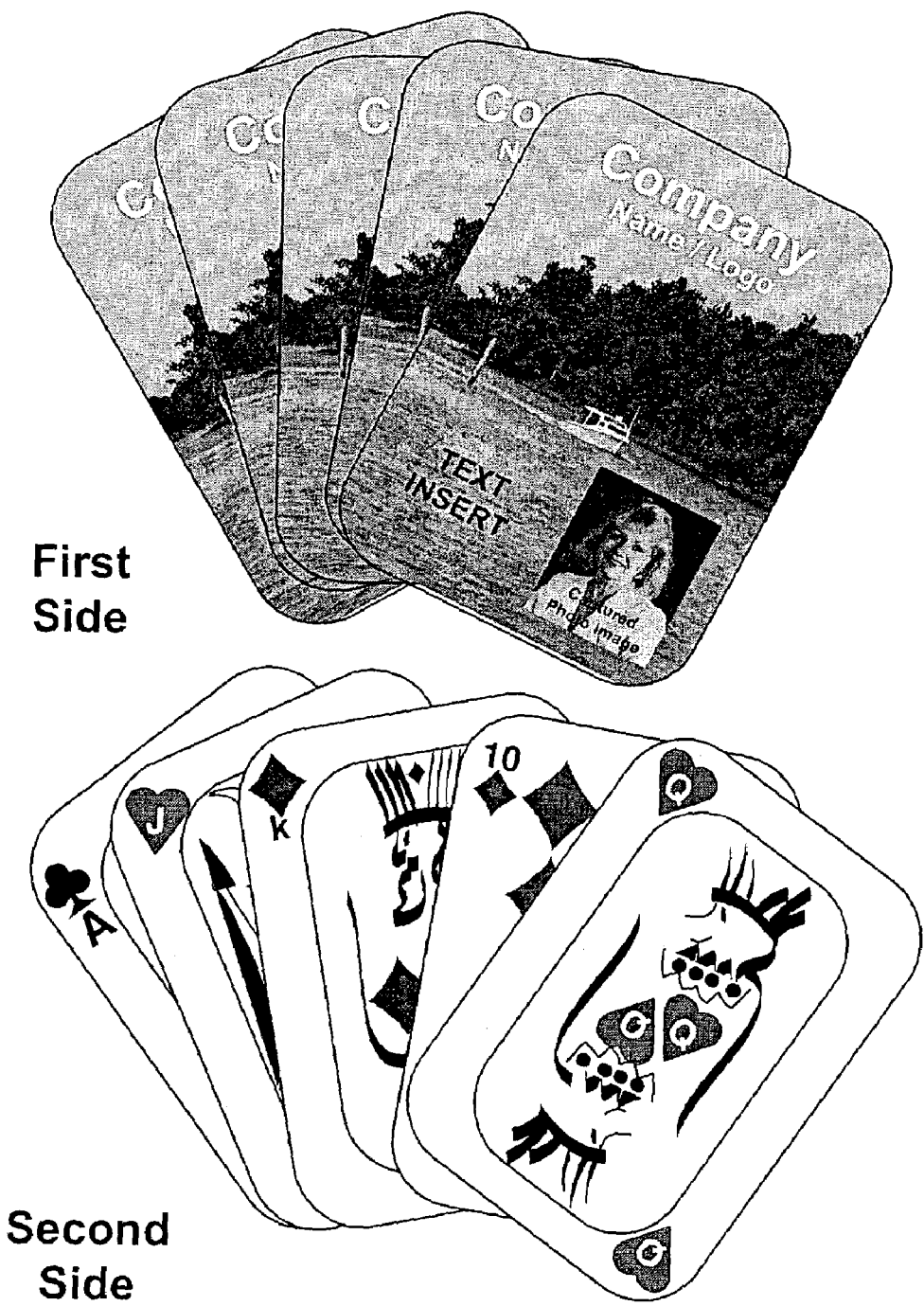
FIG. 5 shows an example of a card supplied by the kiosk of the present invention.

Upon delivery to the product tray 32 of the deck of cards and storage container, Step 16: the computer software program displays on the touch screen 16 or monitor 14 a thank you message and reminder advising the user that additional decks of cards may be ordered. FIG. 5 illustrates a card from a deck of cards that are pre-printed on a second side with standard gaming symbols. The first side is printed, in color, by the components within the kiosk 10 with an image containing: the user's digital image that has been inserted in the template design containing the organization's logo along with selected text. Step 17: The user may order additional decks of cards at the kiosk 10. If a further order is not placed within 2 minutes, the computer software signals the entire system to go into a standby mode.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A digital imaging kiosk, comprising:
    an imaging device adapted to electronically capture an image of an object within visual range of the imaging device;
    an information suite comprising:
        a display device adapted to display an image associated with a captured image captured by the imaging device;
        a user interface adapted to display information to a user and to receive information from a user, the user interface being integral with the display device or separate from the display device or partially integral with the display device and partially separate from the display device;
    a printing device adapted to print to at least one side of one or more substrates;
    a substrate handling device adapted to position a substrate in proximity to the printing device such that the printing device can print to the one or more substrates; and
    an electronic control unit in communication with the information suite, the control unit being adapted to receive and send information to the information suite and to control one or more components of the kiosk based on at least one of information from the user, a predetermined routine, and a combination of information from the user and a predetermined routine; wherein the kiosk is adapted so that the printing device prints an image associated with the image associated with the captured image captured by the imaging device on a first side of a set number of substrates having a preprinted image on a second side of the set number of substrates, the preprinted image being unique from the preprinted image on the substrate printed to immediately before; and
    wherein the substrate comprises an individual card from a deck of playing cards, the back side of the card being the first side of the substrate, the face side being the second side of the substrate, and the kiosk is adapted to provide the user with at least one full deck of playing cards.

2. The kiosk of claim 1, wherein the kiosk is adapted to print text along with the printed image.

3. The kiosk of claim 2, wherein the kiosk is adapted so that the text printed along with the image is selected by the user.

4. The kiosk of claim 3, wherein the kiosk is adapted so that the text printed along with the image can be inputted by the user.

5. The kiosk of claim 3, wherein the kiosk is adapted so that at least part of the text printed along with the image can be inputted by the user.

6. The kiosk of claim 5, wherein the kiosk is adapted so that the user can speak to select at least part of the text printed along with the image.

7. The kiosk of claim 5, wherein the kiosk is adapted so that the user can spell out at least part of the text printed along with the image.

8. The kiosk of claim 1, wherein the kiosk is adapted to allow the user to select the image displayed by the display device.

9. The kiosk of claim 8, wherein the kiosk is adapted to allow the user to select an image from a plurality of the images displayed on the display device.

10. The kiosk of claim 9, wherein at least one of the plurality of images is displayed separately temporally from at least one other of the plurality of images.

11. The kiosk of claim 1, wherein the kiosk further includes an image manipulating device adapted to manipulate the captured image.

12. The kiosk of claim 11, wherein the kiosk is adapted to allow the user to manipulate the captured image.

13. The kiosk of claim 12, wherein the kiosk is adapted to manipulate the captured image automatically.

14. The kiosk of claim 13, wherein the display device is a high-resolution monitor.

15. The kiosk of claim 14, wherein the high-resolution monitor is an LCD.

16. The kiosk of claim 13, wherein the display device is adapted to receive input from the user.

17. The kiosk of claim 1, wherein the kiosk is adapted to allow the user to adjust at least one of the imaging device height, the imaging device focus, and the imaging device direction.

18. The kiosk of claim 1, wherein kiosk also includes an audio system adapted to convey information to the user, the audio system being integrated with the communications suite or being separate from the communications suite.

19. The kiosk of claim 18, wherein the kiosk is adapted so that the information conveyed by the audio system is synchronized with at least some of the information displayed to the user by the information suite.

20. The kiosk of claim 1, wherein the image capturing device includes an auto-focus device adapted to focus the imaging device on at least one portion of the user.

21. The kiosk of claim 1, wherein the communication suite is adapted to display advertisements to the user.

22. The kiosk of claim 18, wherein at least one of the user interface is adapted to display advertisements to the user and the audio-system is adapted to annunciate advertisements to the user.

23. The kiosk of claim 21, wherein the kiosk has at least one side panel extending from the body of the kiosk and includes display components located to be substantially to the sides of the user, wherein the display components are adapted to display advertisements.

24. The kiosk of claim 11, wherein the image manipulating device is adapted to alter the background of the image captured by the imaging device.

25. The kiosk of claim 24, wherein the background is altered based on a predetermined theme associated with the geographic location of at least the image capturing portion of kiosk.

26. The kiosk of claim 1, wherein text is also printed on the first side of the substrate.

27. The kiosk of claim 1, wherein the control unit is located separate from the imaging device.

28. The kiosk of claim 27, wherein the control unit is linked to the image capturing device, the link being at least one of an electrical, optical, RF, and 1R link.

29. The kiosk of claim 1, wherein the kiosk is adapted to electronically record an image associated with at least the captured image and at least some of the information inputted by the user to enable the user be contacted at a later date.

30. The kiosk of claim 1, wherein the printing device utilizes a UV energy curing ink.

31. The kiosk of claim 1, wherein the kiosk is adapted to provide the user with a container with the playing cards.

32. The kiosk of claim 31, wherein the container is a pre-diecut cardboard embryo adapted to allow a user to assemble the diecut into a box, the assembled box being of a suitable size to contain at least one complete deck of playing cards.

33. The kiosk of claim 1, wherein the imaging device is adapted to be mobile.

34. The kiosk of claim 1, wherein the kiosk is adapted to be mobile.

35. The kiosk of claim 1, wherein at least one of the electronic components of the kiosk are powered by at least one of a fuel cell, a battery, and a solar-power array.

36. The kiosk of claim 1, wherein the kiosk further includes at least one of a satellite array, a phone link array, a commercial wireless link array, and a infrared communication port.

37. The kiosk of claim 1, wherein the kiosk is adapted to accept credit card information or debit card information.

38. The kiosk of claim 1, wherein the kiosk is adapted to accept cash or coins and dispense cash or coins.

39. The kiosk of claim 1, wherein the kiosk is adapted to transmit and receive data.

40. The kiosk of claim 1, wherein the kiosk is adapted to transmit at least one status message.

41. A method of operating a digital imaging kiosk, comprising:

capturing an image with an imaging device adapted to electronically capture an image of an object within visual range of the imaging device;

displaying on a display device an image associated with a captured image captured by the imaging device;

displaying information on a user interface adapted to display information to a user and to receive information from a user, the user interface being integral with the display device or separate from the display device or partially integral with the display device and partially separate from the display device, wherein the display device and the user interface comprise an information suite;

printing from a printing device adapted to print to at least one side of one or more substrates;

positioning a substrate in proximity to the printing device with a substrate handling device such that the printing device can print to the one or more substrates; and controlling the kiosk with an electronic control unit in communication with the information suite, the control unit being adapted to receive and send information to the information suite and to control one or more components of the kiosk based on at least one of information from the user, a predetermined routine, and a combination of information from the user and a predetermined routine; wherein the kiosk is adapted so that the printing device prints an image associated with the image associated with the captured image captured by the imaging device on a first side of a set number of substrates having a pre-printed image on a second side of the set number of substrates, the preprinted image being unique from the preprinted image on the substrate printed to immediately before; and wherein the substrate comprises an individual card from a deck of playing cards, the back side of the card being the first side of the substrate, the face side being the second side of the substrate, and wherein the kiosk is adapted to provide the user with at least one full deck of playing cards.

42. The method of claim 41, further comprising printing text along with the printed image.

43. The method of claim 41, wherein text is also printed on the first side of the substrate.

44. The digital imaging kiosk of claim 1, wherein the substrate handling device is adapted to hold substrate in roll form and supply substrate to the printer by unrolling the substrate from the roll.

45. The digital imaging kiosk of claim 44, wherein the kiosk is adapted to separate the substrate from the roll prior to positioning the substrate in proximity to the printing device.

46. The digital imaging kiosk of claim 44, wherein the kiosk is adapted to separate the substrate from the roll after positioning the substrate in proximity to the printing device.

47. The digital imaging kiosk of claim 44, wherein the kiosk utilizes prescalloped substrate, and wherein the substrate is in a roll prior to being positioned in proximity to the printing device.

48. The digital imaging kiosk of claim 2, wherein the kiosk is configured with a die cutter, and wherein the die cutter alters the shape of the substrate.

* * * * *